(12) United States Patent
Lengyel

(10) Patent No.: US 6,614,428 B1
(45) Date of Patent: Sep. 2, 2003

(54) COMPRESSION OF ANIMATED GEOMETRY USING A HIERARCHICAL LEVEL OF DETAIL CODER

(75) Inventor: Jerome E. Lengyel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/326,968

(22) Filed: Jun. 7, 1999

Related U.S. Application Data

(60) Provisional application No. 60/131,437, filed on Apr. 26, 1999, and provisional application No. 60/088,495, filed on Jun. 8, 1998.

(51) Int. Cl.[7] .............................................. G06T 17/00
(52) U.S. Cl. ...................................................... 345/420
(58) Field of Search ................................ 345/473, 474, 345/475, 419, 420, 423, 428, 441; 395/133, 155; 382/100, 103, 154, 243

(56) References Cited

U.S. PATENT DOCUMENTS

| | | | |
|---|---|---|---|
| 5,258,938 A | * 11/1993 | Akamatsu | 364/273 |
| 5,519,818 A | * 5/1996 | Peterson | 395/133 |
| 5,729,671 A | 3/1998 | Peterson et al. | 395/123 |
| 5,736,991 A | 4/1998 | Tada | 345/474 |
| 5,751,931 A | 5/1998 | Cox et al. | 604/67 |
| 5,793,371 A | * 8/1998 | Deering | 345/418 |
| 5,818,463 A | * 10/1998 | Tao et al. | 345/473 |
| 5,914,721 A | 6/1999 | Lim | 345/421 |
| 5,929,860 A | 7/1999 | Hoppe | |
| 5,945,996 A | 8/1999 | Migdal et al. | 345/420 |
| 5,966,133 A | 10/1999 | Hoppe | |
| 5,966,134 A | * 10/1999 | Arias | 345/431 |
| 5,966,140 A | 10/1999 | Popovic et al. | |
| 6,046,744 A | 4/2000 | Hoppe | |
| 6,072,496 A | 6/2000 | Guenter et al. | |
| 6,075,540 A | 6/2000 | Hoppe | |
| 6,108,006 A | 8/2000 | Hoppe | |
| 6,137,492 A | 10/2000 | Hoppe | |
| 6,151,033 A | * 11/2000 | Mihara et al. | 345/475 |
| 6,239,805 B1 | 5/2001 | Deering | |
| 6,239,807 B1 | * 5/2001 | Bossut | 345/430 |
| 6,262,737 B1 | * 7/2001 | Li et al. | 345/419 |
| 6,292,194 B1 | 9/2001 | Powell, III | |
| 6,307,557 B1 | 10/2001 | Deering | |

OTHER PUBLICATIONS

Foley, Computer Graphics:Principles and Practice,1995, Addison–Wesley Publishing Co.,2[nd] Edition.*

Andrew Certain et al., "Interactive Multiresolution Surface Viewing," *SIGGRAPH*, 96, pp. 96–103.

Mike M. Chow., "Optimized Geometry Compression for Real–Time Rendering," *Proceedings of the IEEE Visualization*, 97, pp. 347–354.

Michael Deering, "Geometry Compression," *SIGGRAPH*, 95, pp. 13–20.

Matthias Eck et al., "Multiresolution Analysis of Arbirary Meshes," *SIGGRAPH*, 95, pp. 173–182

(List continued on next page.)

Primary Examiner—Almis R. Jankus
(74) Attorney, Agent, or Firm—Klarquist Sparkman, LLP

(57) ABSTRACT

A space-time level of detail coder converts a time dependent geometry stream into a hierarchical structure, including levels of detail in the space and time dimensions, and expansion records. The expansion records specify how to reconstruct a mesh from deltas representing differences between levels of detail. For low bandwidth transmission, only selected expansion records need be sent depending on the appropriate level of detail of the object being represented for the current time sample.

47 Claims, 11 Drawing Sheets

OTHER PUBLICATIONS

Michael Garland et al., "Surface Simplification Using Quadric Error Metrics," *SIGGRAPH*, 95, pp. 173–182.

Brian Guenter et al., "Motion Compensated Compression of Computer Animation Frames," *SIGGRAPH*, 93, pp. 297–304.

Brian Guenter et al., "Making Faces," *SIGGRAPH*, 98, pp. 55–66.

Stefan Gumhold et al., "Real Time Compression of Triangle Mesh Connectivity," *SIGGRAPH*, 98, pp. 133–140.

Hugues Hoppe, "Progressive Meshes," *SIGGRAPH*, 95, pp. 99–108.

Hugues Hoppe, "View Dependent Refinement of Progressive Meshes," *SIGGRAPH*, 97, pp. 189–198.

Michael Lounsbery et al., "Multiresolution Analysis for Surfaces of Arbitrary Topological Type," *ACM Transactions on Graphics*, vol. 16, Jan. 1997, pp. 34–63.

Jovan Popovic et al., "Progressive Simplicial Complexes," *SIGGRAPH*, 97, pp. 217–224.

John Snyder et al., "Generative Modeling: A Symbolic System for Geometric Modeling," *SIGGRAPH*, 92, pp. 369–378.

Gabriel Taubin et al., "Geometric Compression Through Topological Surgery," *ACM Transactions on Graphics*, vol. 17, Apr. 1998, pp. 84–115.

Gabriel Taubin et al., "Progressive Forest Split Compression," *SIGGRAPH*, 98, pp. 123–132.

Costa Touma et al., "Triangle Mesh Compression," *Proceedings of Graphics Interface*, 98, pp. 26–34.

Denis Zorin et al., "Interpolating Subdivision for Meshes with Arbitrary Topology," *SIGGRAPH*, 96, pp. 189–192.

Marc Levoy, "Polygon–Assisted JPEG and MPEG Compression of Synthetic Images," *SIGGRAPH*, 95, pp. 21–28.

"Intel and MetaCreations Introduce New Open File Format Enabling Scalable 3–D Content and Tools," Press Release dated May 5, 1998. (Downloaded from the World Wide Web on Sep. 23, 2002.).

Candan, et al., "Multi–Layered Storage and Transmission for Animated 3D Polygonal Meshes," Proc. SPIE Conf. Multimedia Storage and Archiving Systems III, vol. 3527, pp. 350–361 (Oct. 1998).

"MetaCreations Announces New 'MetaFlash' Internet Technology," Press Release dated Jan. 7, 1999. (Downloaded from the World Wide Web on Sep. 23, 2002.).

"MetaCreations Announces Free MetaStream Exporter for 3D Studio MAX," Press Release dated Mar. 23, 1999. (Downloaded from the World Wide Web on Sep. 23, 2002.).

U.S. patent application Ser. No. 09/115,572, Hoppe, filed Jul. 14, 1998.

U.S. patent application Ser. No. 09/115,583, Hoppe, filed Jul. 14, 1998.

Hoppe, "Efficient Implementation of Progressive Meshes," *Technical Report, MSR–TR–98–02*, Microsoft Research (Jan. 1998).

Hoppe et al., "Mesh Optimization," University of Washington, Seattle, WA 98195, pp. 1–33 (1993).

Gersho and Gray, "Scalar Quantization I: Structure and Performance," *Vector Quantization and Signal Compression*, Kluwer Academic Publishers, Chapter 5, pp. 133–172 (1992).

Finkelstein et al., "Multiresolution Video," SIGGRAPH 96, pp. 281–290 (1996).

Nayar et al., "Real–Time Focus Range Sensor," IEEE Transactions on Pattern Analysis and Machine Intelligence, vol. 18, No. 12, pp. 995–1001 (1996).

Pentland et al., "Good Vibrations: Modal Dynamics for Graphics and Animation," SIGGRAPH 89, pp. 215–222 (1989).

Rossignac et al., "Multi–resolution 3D Approximations for Rendering Complex Scenes," in Modeling in Computer Graphics: Methods and Applications, eds. Falcidieno et al., Springer–Verlag, pp. 455–465 (1993).

Wallach et al., "Accelerated MPEG Compression of Dynamic Polygonal Scenes," SIGGRAPH 94, pp. 193–197 (1994).

Zitnick et al., "Multi–Baseline Stereo Using Surface Extraction," Technical Report CMU–CS–96–196, Carnegie Mellon University, Pittsburgh, PA (1996).

Zorin et al., "Interactive Multiresolution Mesh Editing," SIGGRAPH 97, pp. 259–268 (1997).

\* cited by examiner

COMPRESSION OF ANIMATED GEOMETRY USING A HIERARCHICAL LEVEL OF DETAIL CODER

RELATED APPLICATION DATA

This patent application claims priority to U.S. Provisional Patent Application No. 60/088,495, entitled Compression of Time Dependent Geometry, filed on Jun. 8, 1998 by Jerome E. Lengyel and Brian K. Guenter, and U.S. Provisional Application No. 60/131,437, entitled Compression of Time-Dependent Geometry, filed on Apr. 26, 1999, by Jerome E. Lengyel, which are hereby incorporated by reference in their entirety.

This patent application is related to co-pending patent applications filed concurrently herewith entitled COMPRESSION OF ANIMATED GEOMETRY USING BASIS DECOMPOSITION by Jerome E. Lengyel, Brian K. Guenter, and Henrique S. Malvar, and COMPRESSION OF ANIMATED GEOMETRY USING GEOMETRIC TRANSFORM CODING by Jerome E. Lengyel, which are hereby incorporated by reference in their entirety.

FIELD OF THE INVENTION

The invention relates to computer generated graphics and more specifically relates to compression of time dependent geometric data.

BACKGROUND OF THE INVENTION

In three-dimensional (3D) graphics, moving objects are modeled using 3D geometric models. These models are typically represented as sets of 3D coordinates that define the position of a mesh of surface elements representing the surface of an object in a 3D space. To render a scene containing 3D object models, the graphics rendering pipeline first performs a series of geometric transformations to transform models from their local coordinate space to global or "world" coordinates of the scene and then to viewing or "camera" coordinates of a 2D view space. It then converts the transformed geometry and its attributes (color, shading) to an array of pixel values representing an output image. This process is typically repeated for each image frame in an animation sequence as the object models move about the scene.

A moving graphical object is expressed in terms of time-dependent geometry. The mesh representing the 3D positions of a model moves and deforms over time to simulate the motion of a 3D object. There are a number of motion models used to describe the motion of 3D geometry in animation. Relatively simple objects can be modeled using geometric transformations on rigid bodies. However, increased computing capacity and the demand for more realistic animation has increased the demand for applications involving real-time playback of complex animated models.

Sophisticated authoring tools and modeling programs such as the Softimage modeling tool from Avid Technology, Inc., are capable of creating extremely complex time-dependent geometry. Free-formed deformation lattices, joint envelopes, and physical simulation, and other manipulations can create complex moving geometry sequences. As real-time applications demand more than simple rigid models with animated transformations, it becomes more critical to develop ways to efficiently store and playback complex animated models with real-time performance.

In addition to increasingly sophisticated authoring tools, advances in 3D capture systems are also likely to increase the complexity of time-dependent geometry used in 3D graphics applications. The term "3D capture" refers to the process of generating a digitized 3D model of a real object. Range scanners currently produce static geometry sets. However, as range-scanner accuracy and speed improves, there will be more sources of large time-dependent geometric meshes. Simulation is another source of rich animated geometry. Finite-element methods produce realistic and complex animations that are too expensive to compute in real time.

As the sources for complex time-dependent geometry become more prevalent, there is an increasing need for more efficient ways to store and transmit time-dependent geometry to reduce memory and bandwidth requirements. Researchers have studied ways to compress static geometry. Please see "Geometric Compression," Michael F. Deering, pp. 13–20, SIGGRAPH '95; "Optimized Geometry Compression for Real-Time Rendering," Mike M. Chow, pp. 347–354, Proceedings of IEEE Visualization, '97; "Real Time Compression of Triangle Mesh Connectivity", Stefan Gumhold and Wolfgang Straβer, pp. 133–140, SIGGRAPH 98; "Geometric Compression Through Topological Surgery", Gabriel Taubin and Jarek Rossignac, ACM Transactions on Graphics, Vol. 17, No. 2, April 1998, pp. 84–115; "Progressive Forest Split Compression", Gabriel Taubin, Andre Gueziec, William Horn, and Francis Lazarus, pp. 123–132, SIGGRAPH 98; "Triangle Mesh Compression", Costa Touma and Crag Gotsman, Proceedings of Graphics Interface '98, pp. 26–34; and "Description of Core Experiments on 3D Model Coding", Frank Bossen (editor), ISO/IEC JTC!/SC29/WG11 MPEG98/N244rev1, Atlantic City, October 1998.While this research addresses compression of static geometry, more work needs to be done to develop ways to compress a moving 3D geometry stream.

In contrast to compression of 3D geometry, the fields of still image and moving image compression are well developed. A variety of techniques can be used to compress still images, such as run-length encoding, JPEG coding, etc. There are also many techniques for compressing image sequences such as MPEG, AVI, etc. Researchers have even presented techniques to use 3D geometry to assist in movie compression. See "Motion Compensated Compression of Computer Animated Frames," Brian K. Guenter, Hee Cheol Yun, and Russell M. Mersereau, pp. 297–304, SIGGRAPH '93; "Polygon-Assisted JPEG and MPEG Compression of Synthetic Images," Mark Levoy, pp. 21–28, SIGGRAPH '95; and "Accelerated MPEG Compression of Dynamic Polygonal Scenes," Dan S. Wallach, Sharma Kunapalli, and Michael F. Cohen, pp. 193–197, SIGGRAPH '94.

In one respect, the traditional graphics rendering pipeline provides a form of compression of animated geometry in the case where an animated object is represented as a static, rigid body that is transformed using a series of animated transformation matrices. In this case, the time-dependent geometric model is reduced to a single mesh representing the rigid body and a series of animated transformation matrices that describe the rigid body's motion over time. This simple separation into coherent parts allows the encoding of a large family of time-dependent animations because moving objects can be constructed as hierarchies of rigid objects. While this is an effective way to compress a limited class of time-dependent geometry, it does not fully address the need for a more general and flexible approach for compressing more complex animated models. Some forms of complex motion are not well simulated using a hierarchy of rigid bodies and associated transformation matrices. In addition, some models are not constructed from rigid bodies, but instead, originate from a geometry source such as an authoring tool or 3D capture tool where the geometry is not expressed in terms of rigid bodies.

SUMMARY OF THE INVENTION

The invention provides methods for coding time-dependent geometry and animation. Aspects of these methods can be implemented in encoders and decoders of time-dependent meshes representing animated 3D objects as well as 3D animation that varies over a dimension other than time. These techniques can be used to store and transfer a 3D geometry stream more efficiently. This is useful within a computer system to reduce bandwidth between a host processor or storage device and a graphics rendering engine. It is also useful for reducing transmission bandwidth between computers on a local or wide area network. In addition, these techniques are useful in dynamic compression contexts, where a geometry stream is encoded within time constraints, such as applications where the geometry stream is generated, coded and then decoded for immediate playback.

In general, the compression methods of the invention code a geometry stream by solving for low-parameter models of the stream and encoding the residual. A compressor operates on a time-dependent geometry structure representing 3D positions of an object at selected time samples. In particular, the coders described below focus on compressing a matrix of vertex positions that represents the 3D positions of a mesh (the columns of the matrix) for series of time samples in an animation sequence (the rows in the matrix represent meshes at selected time samples). The compressor approximates the mesh for each time sample and encodes the residual between the approximated mesh and the actual mesh from a row in the matrix. The compressor encodes a coherent portion of the geometry or base mesh, the residual, and parameters used to approximate the mesh. The decompressor decodes the compressed geometry stream and reconstructs the mesh for selected time samples from the coherent portion, the residual and the parameters used to approximate each mesh.

One form of coder converts a matrix of time dependent geometry into a data structure representing the time-dependent geometry as a hierarchical space-time pyramid. This data structure encodes levels of space and time detail and the deltas between each level of detail. This is a form of compression because the deltas are small even though the size of the matrix increases.

This space-time level of detail representation provides another form of compression during transmission because only the spatial or temporal refinements needed for a particular space-time configuration need to be sent by the encoder to the decoder. Instead of transmitting the entire compressed representation, the decoder transmits to the encoder the required level-of-detail in a feedback channel, and then the encoder transmits just the refinements that are needed to achieve the desired level-of-detail for the current region of space-time.

The principles used to encode animation across space and time may be applied to other dimensions as well. For example, in place of the time dimension, a geometry stream may be encoded across a different dimension, such as joint angle, axis of rotation, or axis of translational motion. In this case, the geometry is encoded hierarchically in the spatial dimension and the new dimension (e.g., in place of the time dimension). Encoding along a dimension in this manner is useful for interactive animation, where the user may control movement of an animated object along the new dimension.

In response to user input specifying the level of detail along this dimension, the coder may compute an update record that specifies how to extract the appropriate level of detail from the hierarchical representation of the geometry.

The above coding techniques may be extended to other forms of geometric data used in animation. For example, they apply to coding of texture coordinates.

Further features of the invention will become apparent with reference to the following detailed description and accompanying drawings.

DETAILED DESCRIPTION

Introduction

Figure 1:
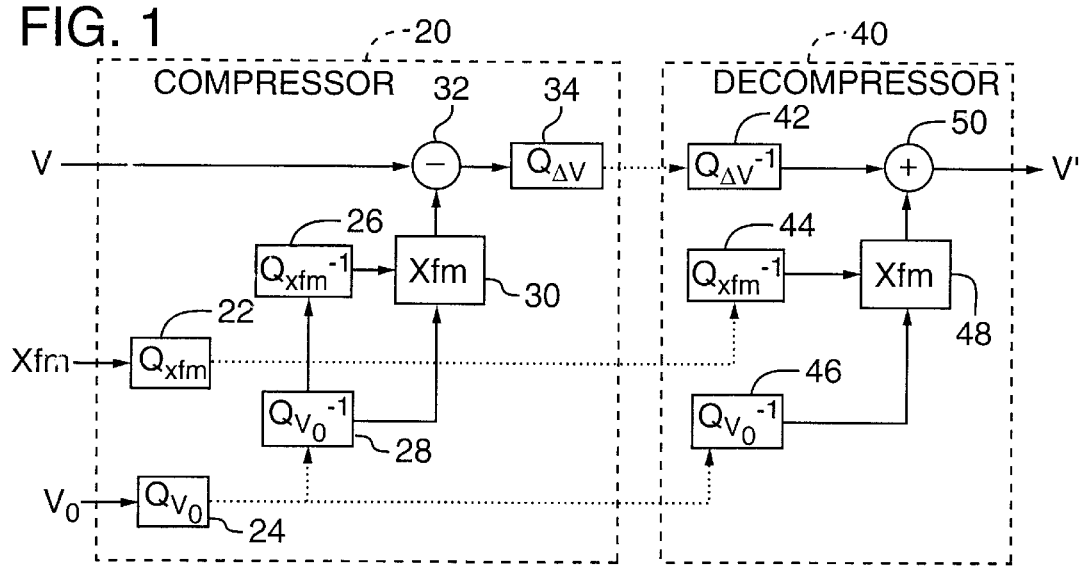
FIG. 1 is a block diagram illustrating an example of a mesh transform coder.

The time-dependent geometry that describes the motion of an animated 3D object can be expressed in the following matrix of 3D positions, P:

$$P = \begin{bmatrix} p_0^0 & \cdots & p_0^{\alpha_\infty-1} \\ \vdots & & \vdots \\ p_{\beta_\infty-1}^0 & \cdots & p_{\beta_\infty-1}^{\alpha_\infty-1} \end{bmatrix} \begin{matrix} \text{continuous positions} \\ \\ \text{continuous time} \end{matrix}$$

Each column in matrix P represents a 3D position, such as a vertex position in a 3D mesh. The rows represent increments of time, such as frames in an animation sequence. The superscript for each element in the matrix identifies a 3D position, and in this notation corresponds to the column number. The subscript for each element in the matrix identifies a time increment, and corresponds to the row number in the matrix. If the matrix P is considered to be continuous in space, then it conceptually has an infinite number of 3D positions (columns) that completely describe the 3D surface of an object. In actuality, there are a finite number of the 3D positions for each time increment in an animation, corresponding to the geometric level of detail of the animation at that time. If the matrix P is considered to be continuous in time, then there are conceptually an infinite number of rows. In a graphic rendering pipeline, of course, the 3D model is rendered into an output image at discrete times, and most likely at a periodic rate such as the frame rate. In some architectures, the update rate of an object can vary, and therefore, each row need not correspond to a frame in an animation sequence. In a more general representation, the rows simply correspond to time samples.

The matrix P can be factored into three components as shown in the following expression:

$$P = \overbrace{\begin{bmatrix} S \end{bmatrix}}^{\text{time interpolation}} \overbrace{\begin{bmatrix} V \end{bmatrix}}^{\text{vertex positions}} \overbrace{\begin{bmatrix} G \end{bmatrix}}^{\text{geometry interpolation}}$$

Component G is the polygon interpolation or surface patch interpolation implemented in the low-level graphics hardware. The component S is an interpolation of the matrix through time. In other words, the time interpolation component specifies the discrete times at which the 3D model is rendered to an output image. By controlling the level of spatial and temporal detail through the geometry and time interpolation functions, arbitrary space-time polytopes may be encoded using this formulation.

Since the time and geometry interpolation components are typically implemented in graphics rendering hardware, the compression techniques described below focus on the vertex position matrix, V.

Each column of the vertex position matrix, V, describes the motion of a single vertex.

$$V = \begin{bmatrix} v_0^0 & \cdots & v_0^{n-1} \\ \vdots & & \vdots \\ v_{m-1}^0 & \cdots & v_{m-1}^{n-1} \end{bmatrix} \begin{matrix} \text{continuous positions} \\ \\ \text{time samples} \end{matrix}$$

The columns of the matrix V represent vertex positions. In particular, the superscript of each element in the matrix V identifies the vertex. The rows in the matrix V represent time samples. Subscripts of each element in the matrix V identify the time samples.

Generic Weighted Trajectories

All of the following techniques can be considered specializations of the following mesh animation approach:

$$V = \begin{bmatrix} d_0^0 & \cdots & d_0^{k-1} \\ \vdots & & \vdots \\ d_{M-1}^0 & \cdots & d_{M-1}^{k-1} \end{bmatrix} \begin{bmatrix} \alpha_0^0 & \cdots & \alpha_0^{N-1} \\ \vdots & & \vdots \\ \alpha_{k-1}^0 & \cdots & \alpha_{k-1}^{N-1} \end{bmatrix}^{\text{influence}}$$

Affine Transformations

In typical graphics architectures, the matrix V is factored into hierarchies of rigid objects. This is a smaller class of moving geometry than the more general V matrix above because it is limited to a specific type of motion, namely, a series of affine transforms performed on rigid bodies. To illustrate this concept, the special case of matrix V for rigid body motion can be expressed as:

$$V_R = \overbrace{\begin{bmatrix} A_0^0 & \cdots & A_0^{R-1} \\ \vdots & \ddots & \vdots \\ A_{m-1}^0 & \cdots & A_{m-1}^{R-1} \end{bmatrix}}^{\text{affine transformations}} \overbrace{\text{diag}(\hat{V}^0 \ldots \hat{V}^{R-1})}^{\text{rigid bodies}}$$

In this case, the time-dependent geometric matrix for rigid bodies $P_R = V_R G$ is factored into three components: affine transformations, rigid bodies, and geometry interpolation. The left matrix represents affine transformations, with each row corresponding to a frame of animation, and each column corresponding to an affine transform of a rigid body. In the above expression, the affine transformations in the left matrix are the only changing terms and are updated for each frame. The rigid bodies shown above each consist of a set of vertices forming a rigid structure and having a column of affine transforms associated with it. The geometry interpolation component consists of an interpolation function for each rigid body that is used to interpolate attributes stored at vertices in the rigid body to output device coordinates.

There are two primary types of graphics rendering architectures: immediate-mode architectures and retained-mode architectures. Immediate-mode architectures re-send the entire vertex and geometric connectivity matrices each frame. This process can require a great deal of bandwidth because the large amount of data that needs to be sent to a 3D geometry rendering subsystem for each frame. Retained-mode architectures, in contrast, send the vertex and geometric connectivity matrices just once for a sequence of frames, and encode the changing affine transformation used to instruct the 3D rendering subsystem how to modify the position of the rigid bodies for each frame.

In fact, the segmentation of the columns of the matrix V into sets of rigid bodies with coherent motion is a form of compression because it enables the frame-to-frame changes in position of the 3D geometry to be encoded in the affine transforms. However, it is rather limiting from the standpoint that this motion model applies only to rigid bodies whose motion can be defined in terms of affine transformations. The following sections describe methods of compressing a more general time-dependent matrix of vertex positions that is not limited to animated rigid bodies.

Free-Form Deformations

More general graphics architectures overcome this limitation on the motion of the rigid bodies by supporting more general parameterized deformations. Examples of more general 3D motion models include inverse-kinematic linkages with free-form deformation lattices. This form of motion model is used widely for character animation. The following expression illustrates how the general time-dependent geometry matrix is factored for this more general motion model. The factors of the time-dependent geometry matrix include a matrix of deformation functions F, a series of rigid bodies V, and corresponding series of geometry interpolation functions for each of the rigid bodies G.

$$V_{FFD} = \overbrace{\begin{bmatrix} F_0^0 & \cdots & F_0^{R-1} \\ \vdots & \ddots & \vdots \\ F_{m-1}^0 & \cdots & F_{m-1}^{R-1} \end{bmatrix}}^{\text{deformation}} \overbrace{\text{diag}(\hat{V}^0 \ldots \hat{V}^{R-1})}^{\text{rigid bodies}}$$

The deformation functions in the matrix on the left typically have a small number of parameters that define the motion of a set of vertices that form a rigid body. These motion parameters for each deformation function are sometimes splined through time or are computed from user input to determine the position of a rigid body for a frame in an animation sequence. In the above expression, the multiplication of a deformation function F with a corresponding rigid body V indicates the application of the deformation function F to the vertices of the rigid body.

$$V_{FFD} = \overbrace{\begin{bmatrix} f_0^0 & \cdots & f_0^{k(R-1)} \\ \vdots & \ddots & \vdots \\ f_{m-1}^0 & \cdots & f_{m-1}^{k(R-1)} \end{bmatrix}}^{\substack{\text{deformation} \\ \text{vertices}}} \text{diag} \overbrace{\begin{matrix} (v_0^0 & \cdots & v_0^{R-1}) \\ \vdots & & \vdots \\ v_{k-1}^0 & \cdots & v_{k-1}^{R-1} \end{matrix}}^{\substack{\text{parametric coordinates} \\ \text{of rigid bodies}}}$$

Key Shapes

Another useful compression technique is to decompose the matrix into basis functions and weights. This technique goes by several names: principal component analysis or the KL-transform (Karhunen-Loeve).

$$V_{KL} = \overbrace{\begin{bmatrix} w_0^0 & \cdots & w_0^{k-1} \\ \vdots & & \vdots \\ w_{M-1}^0 & \cdots & w_{M-1}^{k-1} \end{bmatrix}}^{\text{weight}} \overbrace{\begin{bmatrix} \hat{v}_0^0 & \cdots & \hat{v}_0^{N-1} \\ \vdots & & \vdots \\ \hat{v}_{k-1}^0 & \cdots & \hat{v}_{k-1}^{N-1} \end{bmatrix}}^{\text{mesh basis vectors}}$$

This transformation maximally decorrelates the data and produces an orthonormal basis. However, the KL approach cannot capture non-linear transformations of the data. Imagine a rigid shape spinning around the z-axis while translating in x. There is no set of basis shapes that can be combined to capture this simple rotation plus translation.

Skinning

Another widely used technique is to use "skinning" weights $\beta j$ on each vertex to determine how the moving "bone" coordinate frames $C_i$ deform the mesh. Typically, most of the weights are zero, so the per-vertex weight matrix is sparse. The advantage to this technique is that a single rest shape can be deformed by a set of coordinate frames embedded near the region of interest. The inverse of the initial frame is pre-pended to the current coordinate frame to get the "bone" coordinate frame.

$$V_{Skin} = \overbrace{\begin{bmatrix} C_0^0 & \cdots & C_0^{R-1} \\ \vdots & & \vdots \\ C_{m-1}^0 & \cdots & C_{m-1}^{R-1} \end{bmatrix}}^{\text{"bone" frames}} \overbrace{\begin{bmatrix} \beta_0^0 I & \cdots & \beta_0^{n-1} I \\ \vdots & & \vdots \\ \beta_{R-1}^0 I & \cdots & \beta_{R-1}^{n-1} I \end{bmatrix}}^{\text{per-vertex weights}} \overbrace{\text{diag}(v_0 \ldots v_{R-1})}^{\text{rest shape vertices}}$$

Special-Case Weighted Trajectories

Time dependent geometry may also be represented through the motion of selected control points in a 3D space, along with an association between these control points and the vertices in a mesh. See co-pending U.S. patent application Ser. No. 09/093,590, entitled, "Method And System For Capturing And Representing 3d Geometry, Color And Shading Of Facial Expressions And Other Animated Objects," by Brian Guenter, Cindy Marie Grimm, and Henrique Sarmento Malvar (Guenter et al.), which is hereby incorporated by reference in its entirety. In Guenter et al, the motion of the control points is applied to the associated vertices to deform the mesh. The motion of a control point from one frame to another is referred to as a trajectory.

While this use of control points is generally applicable to a variety of graphics applications, Guenter et al used control points to encode time-varying geometry representing a human face. Guenter et al recovered the motion of an actor's face by attaching fiducial "dots" and then using vision techniques to recover the motion of the dots. Guenter et al also captured a static 3D mesh representing the actor's face in a rest position using a conventional 3D capture system. Using these dots as control points, Guenter et al applied the movement of the dots to deform the mesh, as follows:

$$V_{Face} = V_0 + \overbrace{\begin{bmatrix} d_0^0 & \cdots & d_0^{k-1} \\ \vdots & & \vdots \\ d_{M-1}^0 & \cdots & d_{M-1}^{k-1} \end{bmatrix}}^{\text{dot trajectories}} \overbrace{\begin{bmatrix} \alpha_0^0 & \cdots & \alpha_0^{N-1} \\ \vdots & & \vdots \\ \alpha_{k-1}^0 & \cdots & \alpha_{k-1}^{N-1} \end{bmatrix}}^{\text{dot influence}}$$

Guenter et al compress this factorization further by calculating the principal components of the dot trajectory matrix and then coding the resulting coefficients.

$$V_{Face} = V_0 + \overbrace{\begin{bmatrix} w_0^0 & \cdots & w_0^{L-1} \\ \vdots & & \vdots \\ w_{M-1}^0 & \cdots & w_{M-1}^{L-1} \end{bmatrix}}^{\text{dot coefficients}} \overbrace{\begin{bmatrix} b_0^0 & \cdots & b_0^{k-1} \\ \vdots & & \vdots \\ b_{L-1}^0 & \cdots & b_{L-1}^{k-1} \end{bmatrix}}^{\text{dot basis}} \overbrace{\begin{bmatrix} \alpha_0^0 & \cdots & \alpha_0^{N-1} \\ \vdots & & \vdots \\ \alpha_{k-1}^0 & \cdots & \alpha_{k-1}^{N-1} \end{bmatrix}}^{\text{dot influence}}$$

This encoding scheme uses key shapes for the dot trajectories and then applies the motion of the dots to the rest of the vertices.

Segmentation

The first step is to decide which columns of the vertex matrix V should be encoded in local coordinate systems. For certain classes of animation, the modeling package can provide this information. Several current animation packages use "bones" and "skinning", in which coordinate frames are weighted to produce the final vertex position. For generic animations (output of simulations, shape cameras, etc.), we analyze the input vertex matrix for good decompositions. Automatic analysis is also useful if the number of "bones" needs to be changed for the run-time system. This clustering problem is common in learning, vector quantization, and other compression techniques. In our case, the vectors consist of the columns of the vertex matrix. The problem is to decide how many clusters are needed and which vertices should belong to each cluster. A further issue is to decide the class of deformation for each cluster.

The cluster segmentation problem is as follows: Given vertex matrix V, return number of clusters, ncluster, and a list of cluster assignments for each vertex. Multiple assignment is allowed, so that each vertex may belong to a set of clusters and have an associated weight. Each cluster has an associated time-varying coordinate frame C that is given or calculated based on the vertices that are members of the cluster.

$$v^j(t) = \sum_k w_k^j C_k(t)$$

The prototype segmentation algorithm uses a greedy clustering approach based on the triangles of the original mesh. A set of seed triangles is chosen at random. All of the triangles can be used as seed triangles, if desired, but the experiments below used approximately 10% of the original triangles in the mesh. The coordinate-frame trajectories of the seed triangles are compared and the clusters combined if within a given tolerance. The trajectories of the vertices are projected to the local coordinate system of each of the resulting clusters and classified according to the quality of the match throughout the trajectory.

Geometric Transform Coding

Geometric transform coding refers to a method for compressing time-dependent geometry by approximating the motion of 3D geometry with a geometric transform and then encoding the difference between transformed 3D geometry and the actual position of the 3D geometry for selected time samples throughout an animation sequence. These time samples correspond to the times in the animation sequence where the position of the object is updated (not necessarily every frame). The time-dependent geometry of an animation sequence is expressed as a series of 3D meshes, each identifying a set of vertex positions at a particular time sample in an animation. A specific example of this form of time-dependent geometry is the vertex position matrix V described above. The geometric transform coding method begins by selecting a base mesh. It then determines a geometric transform between the base mesh and each of the meshes in the animation. To compress time-dependent geometry, this method determines the difference between a transformed base mesh and the actual mesh, called the residual.

The geometric transform coding method is competitive with the special case where the time-dependent geometry is comprised of animated rigid bodies. In this special case, the base mesh corresponds to the rigid body and the geometric transform corresponds to motion model applied to the rigid body, such as an affine transformation or lattice free-form deformation. To demonstrate the concept, consider a block of vertices that are animated together, i.e. a block of columns that corresponds to a rigid body in either of the simpler classes of moving geometry, such as affine transformations or inverse kinematic linkages with free-formed deformation lattices. The residual in this case measures the distortion between the transformed base rigid body and the current mesh. The following expression illustrates the computation of the residual for the case where a deformation function F is applied to a rigid body $\hat{V}$.

$$\Delta V^j = V^j - \begin{bmatrix} F_0^j \\ F_1^j \\ \vdots \\ F_{m-1}^j \end{bmatrix} [\hat{V}_j]$$

If the time-dependent geometry for the animation sequence is created by applying the deformation function to a rigid body, then there will be no distortion. The geometric transform coding methods described below are more general because they can represent more general forms of motion and can be adapted to encode arbitrary meshes where the deformation function or the rigid body portions of the time-dependent geometry are not known at the time of coding.

To compress a given data set representing time-dependent geometry, the geometric transform method quantizes and encodes the deformation parameters, the base mesh or meshes, and the residual. When the time-dependent geometry matches one of the simpler subclasses (rigid body or lattice FFD), the residuals are zero and can be encoded with very low overhead.

The geometric coding method can be used alone, or in combination with other compression techniques described below to take advantage of the coherence in the time-dependent geometry matrix V. One way to further take advantage of the temporal and spatial coherence in the time-dependent geometry matrix is to identify and encode coherence among the rows and columns of the matrix V. The methods for coding time-dependent geometry described below improve upon the compression inherent in simpler motion modules, and yet are applicable to more complex motion models while still being compatible with current 3D graphics rendering architectures.

FIG. 1 is a block diagram illustrating an example of a mesh transform coder. FIG. 1 shows both the compressor 20 and the decompressor 40 to illustrate how the time-dependent geometry is encoded for transmission or storage and then decoded. There are three types of input to the compressor 20: The matrix V representing the positions of mesh vertices as they change over time, a base mesh V, and geometric transforms ("xfm") that match the base mesh with meshes in the time-dependent matrix, V. The compressor quantizes and encodes the transformation parameters of the geometric transforms, the base mesh, and residuals. To minimize the distortion of the reconstructed meshes in the decompressor, the compressor computes the residual using quantized/de-quantized transformation and base mesh parameters.

The base mesh in this encoder is intended to be a mesh of vertices representing a rigid body. However, in some implementations, the base mesh may not be provided to the coder and has to be derived from the stream of time-dependent geometry, V. In these circumstances, the base mesh may be calculated by using a row of the matrix V as the base mesh, by taking an average of several rows of V as the base mesh, or by pre-computing the base mesh that results in the smallest combined bandwidth for the transformation parameters and the residuals. The latter approach is a non-linear optimization of both the transformation parameters and the base mesh at the same time.

The geometric transforms ("Xfm") illustrated as input to the compressor in FIG. 1 are sets of geometric transformation parameters used to transform the position of the base mesh to a new position at a selected time sample increments. In a conventional graphics rendering pipeline, the selected time increments typically correspond to frames in an animation sequence. However, the time increments may more generally correspond to time samples to be compatible with rendering architectures that enable objects to be updated at varying rates. Since the transformation parameters are used to transform the base mesh to a new position for each time sample, each sample has a corresponding set of transformation parameters. In the case where the base mesh represents a rigid body, the transformation parameters represent a geometric transform such as an affine or a general free-form deformation that transforms the rigid body from its local coordinate system to the world coordinates of the animated graphics scene.

The compressor 20 includes quantizer modules 22, 24 for quantizing the transformation parameters and 3D position values in the base mesh, respectively. The compressor also includes de-quantizers 26, 28 used to de-quantize the transformation parameters and 3D position values of the base mesh. The transform module 30 shown in the compressor applies the de-quantized transformation parameters to the de-quantized 3D position values to produce a transformed mesh approximating the current position of the time-dependent geometry. A subtractor module 32 then computes the difference between the values of the transformed base mesh and the corresponding elements of the matrix V. In particular, the subtractor module computes the difference between the de-quantized and transformed base mesh vertices and the vertices in the row of the vertex position matrix V for the current time sample.

The output of the compressor 20 includes the quantized transformation parameters per time sample and the quantized base mesh, sent once at the beginning of the compressed data stream. The output also includes the quantized residual for each time sample computed in the quantizer 34. The compressed data stream, therefore, encodes the base mesh once for an animation sequence, and encodes transformation parameters in the residuals for several time samples in the animation sequence, such as each frame in the animation sequence. The compressed data stream can either be stored in persistent memory for later use or sent to a transmitter for transmission to another computer or rendering device.

The decompressor 40 reconstructs time-dependent geometry for selected time increments from the compressed data stream. In particular, the decompressor reconstructs the matrix of vertex positions, one row at a time, for time samples in an animation sequence. The de-quantizers 42, 44, and 46 in the decompressor de-quantize the residuals, the transformation parameters, and the 3D position data of the base mesh, respectively. A geometric transform module 48 applies the de-quantized transformation parameters for the current time sample to the de-quantized base mesh to compute a transformed base mesh. An adder module 50 combines the transformed base mesh for the current time sample with the corresponding de-quantized residual for that time sample to compute the current 3D positions of the time-dependent geometry.

The decompressor 40 can be used in on-line rendering applications where the compressed time-dependent geometry is retrieved and sets of vertex positions are reconstructed in sufficient time to present geometry to a 3D graphics rendering subsystem for rendering in an animation sequence.

Transformation Matching

In some applications, the time-varying transformation parameters are not available before the coding of the time-dependent geometry commences. This is especially the case in applications involving the coding of a more general matrix representing sets of time-dependent vertex positions that are not simply a rigid body transformed using a standard geometric transform such as an affine transformation or a free-form deformation. For these applications, the compressor derives a series of transformations that best match a base mesh to the current mesh for selected increments of time in an animation sequence. Below, we describe a coder that derives the transformation parameters for a matrix representing time-dependent geometry with general, arbitrary motion. The example that is described and illustrated refers specifically to deriving affine transformations, but the same approach can be applied to other motion models as well.

Figure 2:
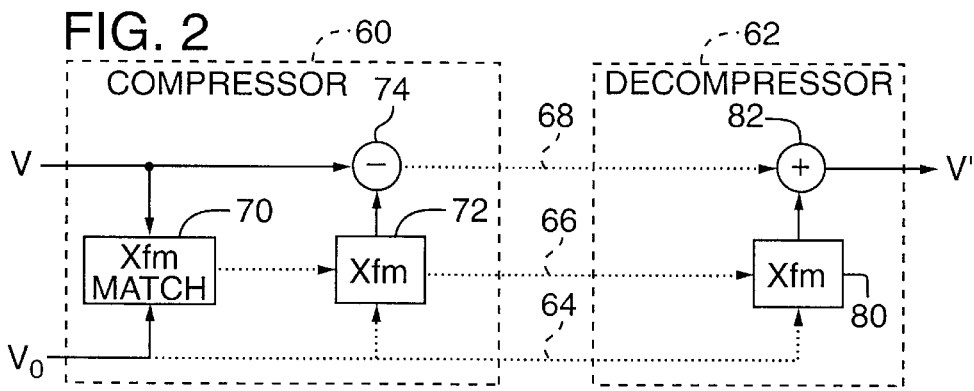
FIG. 2 is a block diagram of a base mesh transform coder that performs transformation matching to derive transformation parameters from time-dependent geometry.

FIG. 2 is a block diagram of a base mesh transform coder that performs transformation matching to derive transformation parameters from time-dependent geometry. Like FIG. 1, FIG. 2 shows a compressor module 60 and a de-compressor module 62. To simplify the diagram, the quantizer and de-quantizer modules shown in FIG. 1 are represented as dashed lines 62–68 in FIG. 2.

The inputs to the compressor 60 include the base mesh $V_0$ and a matrix of vertex positions, V, representing time-dependent geometry. In contrast to the special case where the base mesh represents a rigid body, the base mesh in the more general case is not necessarily known before coding begins. The base mesh may be derived from the matrix V. For example, the base mesh may be selected by using a row of V, by taking an average of the rows of V, or by pre-computing the base mesh that results in the smallest combined bandwidth for the transformation parameters and the residuals as discussed above.

Like the base mesh, the transformation parameters can also be derived from the matrix of vertex positions. As shown in FIG. 2, a transform match module 70 in the compressor 60 determines the geometric transform that best matches the base mesh to each of the time-dependent meshes in the matrix V. Each of the rows in the matrix V corresponds to a mesh at a selected time. The transform match module 70 calculates transformation parameters for a geometric transform used to transform the base mesh to approximate the position of a mesh stored at a row in the matrix V.

The compressor 60 includes a transform module 72 that applies de-quantized transformation parameters to de-quantized base mesh parameters to approximate the position of the current mesh. A subtractor module 74 then computes the difference between the 3D positions of the transformed base mesh and the current mesh to produce a residual. The residual, transformation parameters, and base mesh parameters are quantized and transmitted as shown in dash lines 64, 66, and 68. The base mesh is only transmitted once for a typical animation sequence. The transformation parameters and a residual are computed for each time sample in the animation being encoded. Typically, this time sample corresponds to a frame in an animation sequence.

As in FIG. 1, the decompressor 62 of FIG. 2 represents a component used to decode a compressed data stream and reconstruct a stream of time-dependent geometry. In addition to the de-quantizer modules inherent in the dashed lines 64–68, the decompressor 62 also includes a transform module 80 and an adder module 82. The transform module applies de-quantized transform parameters to a de-quantized base mesh to compute a transformed base mesh for a selected time sample. The adder module 82 takes the transformed base mesh and combines it with the residual mesh for that time to reconstruct a mesh. The transform module 80 and adder module 82 repeat this process for additional sets of transformation parameters and associated residual meshes.

The implementation of the transform match module 70 depends, in part, on the motion model used to approximate the change the position between the base mesh and a corresponding mesh of the matrix, V. For example, if the 3D motion is estimated based on an affine transformation model, the transform match module 70 computes affine transformation coefficients that result in the closest match between the transformed base mesh and a corresponding mesh at a selected point in time. The expression for computing the transformation coefficients may be expressed as follows:

$$A_k \hat{V}_0 = V_k$$

In the above expression, $A_k$ is the desired 4×4 matrix used to transform base mesh $V_0$ to $V_k$, the current row of the general matrix V. One technique for finding the transformation coefficients that represent the best least-squares solution is to compute the singular value decomposition (SVD) of the base mesh, $V_0$, and apply the decomposition of the base mesh to the current row of V. This approach can be computationally expensive for large matrices. To reduce the complexity of this computation, the transform match module 70 can be adapted to use one or more of the optimizations discussed below. One optimization is to make the computation using lower level-of-detail vertex matrices for the base mesh and the current mesh. The lower level-of-detail matrices can be used to compute an approximation to the best least-squares solution, which can then be applied to the full matrix.

Another optimization is to use normal equations, which involves the accumulating and inverting of a 4×4 fitting matrix for the base mesh, and the matrix product of an n by 4 matrix with the fitting matrix. This approach is depicted mathematically in the following two expressions:

$$K = V_0^T (V_0 V_0^T)^{-1}$$

$$A = VK$$

While the technique of normal equations is not as robust as solving the full system of equations to determine the transformation coefficients, it works reasonably well in practice. This approach is not as accurate as solving for the full system because information is lost when projecting to the smaller subspace. However, the transformation coefficients are only an approximation of the motion of a mesh, and therefore, the technique of normal equations is sufficiently accurate. To calculate the best matching affine transformation for each frame of a block of segmented vertices, the prototype employs the following method:

1) Using the rest shape $V_0$ (which is either the first row of the vertex matrix or a typical pose of the model), compute the matching matrix $K = V_0^T (V_0 V_0^T)^{-1}$.
2) For each frame j of the animation, compute the best matching affine transformation as $A_j = V_j K$.
3) When the group of vertices is degenerate (i.e. when all the points lie in a plane), then the $V_0 V_0^T$ matrix is singular or poorly conditioned. In this case, additional vertices are added to augment the rest shape vertices $V_0$ and the per-frame vertices $V_j$ to remove the degeneracy. The additional vertices are derived from the triangles associated with the vertex set, by offsetting the center of each triangle along each triangle's normal.

If the geometric transformation used in the technique illustrated in FIG. 2 is an affine transformation, then it is possible to combine the geometric transformation used to approximate the position of a mesh for a current frame along with the viewing transformation for that frame. The geometric transform coder can be modified to the form shown in FIG. 3 so that the geometric transform can be combined with the viewing transform.

Figure 3:
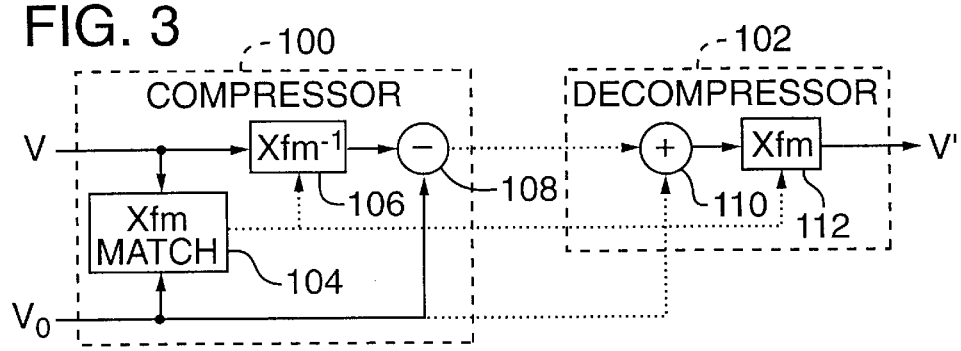
FIG. 3 is a block diagram illustrating an alternative base mesh transform coder that encodes the inverse geometric transform rather than the geometric transform.

FIG. 3 is a block diagram illustrating an alternative base mesh transform coder that encodes the inverse geometric transform rather than the geometric transform. In this type of coder, the residuals for each time sample are calculated in the coordinates of the transformed base mesh, instead of subtracting the transform base mesh from the current mesh in the local coordinates of the current mesh. This calculation is illustrated in the following expression:

$$\Delta V_k^j = (a_k^j)^{-1} V_k^j - \hat{V}_0^j$$

In the above expression, the residual parameters $\Delta V_k$ are computed as the difference between: 1) the current row of the matrix of vertex positions transformed to the coordinate space of the base mesh, and 2) the base mesh $V_0$. Instead of matching the transformed base mesh to the current mesh, the transformation parameters match the current mesh to the base mesh.

The compressor 100 and de-compressor 102 in the inverse transform coder shown in FIG. 3 operate on the same input data and have similar components as the mesh transform coder of FIG. 2. In particular, a transform match module 104 in the compressor computes transformation parameters that match the transformed current mesh with the base mesh. An inverse transform module 106 then applies de-quantized transformation parameters to the current mesh to transform the current mesh to the base mesh coordinates to compute the residual, a subtractor module 108 computes the difference between the corresponding elements of the transformed current mesh and the base mesh. The compressor repeats this process for each row in the input matrix V to produce a compressed geometry stream.

The decompressor operates on a quantized residual, quantized transform parameters, and the quantized base mesh. To reconstruct each mesh in the time-dependent geometry, an adder module 110 in the decompressor 102 combines the de-quantized parameters of the base mesh with the quantized residual. A geometric transform module 112 in the decompressor takes as input the de-quantized transforms that combine the viewing transform for the current frame with the 3D deformation transform computed in the compressor. The transform module 112 transforms the current mesh from base mesh coordinates to world coordinates, and then from world coordinates to viewing coordinates. This approach allows the transformation module in the compressor to combine the 3D transform computed in the transform matching with a standard modeling and camera transformations of the graphics rendering pipeline.

Mesh Feedback

As noted in the previous sections, the base mesh for some forms of time-dependent geometry is a pre-defined mesh representing a rigid body while in other applications, the mesh is derived from a general vertex of matrix positions. To take advantage of coherence of the time-dependent geometry over time, a geometric transform coder can be adapted to use the mesh of the previous frame as base mesh for the current frame. This approach adds a feedback loop that uses the mesh of the previous frame as a predictor of where the mesh will be in the current frame. It is important to note that this form of prediction is different than row prediction performed on the matrix of vertex positions because the transformation is in 3D coordinate space instead of N-dimensional vector space. However, as explained in further detail below, both row and column prediction can be used to further compress a matrix of 3D position data such as the residual or the base mesh.

Figure 4:
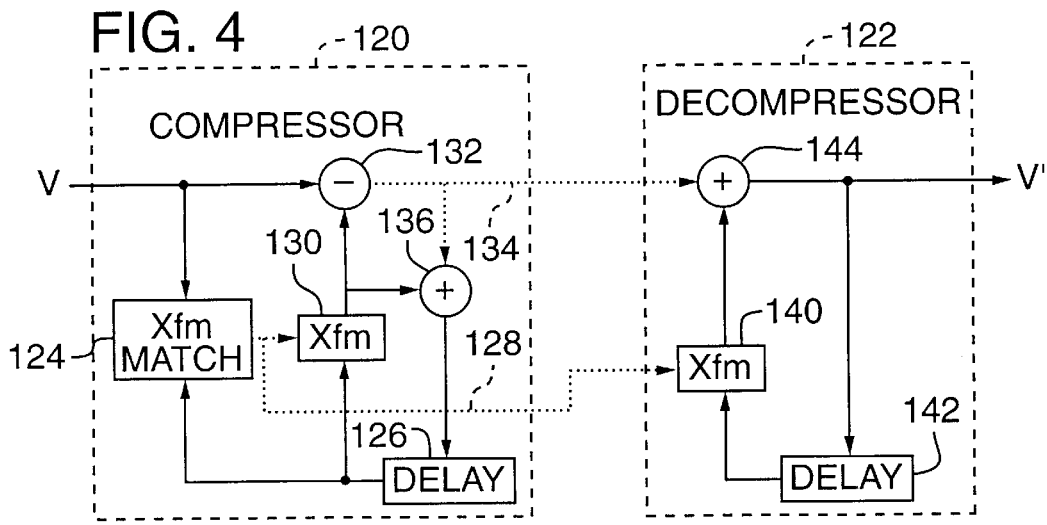
FIG. 4 illustrates a block diagram of another type of mesh transform coder that uses a mesh computed for a previous time sample as the base mesh for the current time sample.

FIG. 4 illustrates a block diagram of a mesh transform coder that uses a mesh computed for a previous time sample as the base mesh for the current time sample. FIG. 4 shows both the compressor 120 and de-compressor 122 for this type of coder. In this coder, the base mesh for each current frame is the constructed mesh from the previous frame.

In addition to computing the residual as in the other mesh coders, the compressor also reconstructs and maintains a copy of the re-constructed mesh from the previous time sample. Starting with an initial mesh as a predictor for the mesh of the first frame, the transform match module 124 finds the best transformation to map the approximate vertices V' of the previous frame to the mesh of the next frame. Since the current mesh is typically more similar to the previous frame's mesh than a single base mesh for the entire animation sequence, this approach tends to result in smaller residual values.

The transform match module 124 operates on the approximate mesh stored temporarily in "delay" memory 126 and finds transformation parameters that best match the previous mesh with the current mesh. As in FIGS. 2 and 3, the dashed lines represent pairs of quantizers and de-quantizers. The compressor quantizes the transformation parameters from the transform match module 124. Quantized transformation parameters form part of the compressed data stream 128 and are also fed to a de-quantizer before being used to compute the residual in the compressor.

The transformation module 130 applies the de-quantized transformation parameters to the approximate mesh computed for the previous frame to compute a transformed mesh that estimates the position of the mesh of the current frame. A subtractor module 132 in the compressor computes the residual as the difference between the transformed mesh of the previous frame and the current mesh. The residual is then quantized, and the quantized residual forms a second part of the compressed data stream 134 along with the quantized transformation parameters 128.

A feedback loop in the compressor reconstructs the approximation of the current mesh and temporarily stores the approximate mesh of the current frame in memory 126. Specifically, adder module 136 combines the residual 3D position data computed for the current frame with the transformed version of the previous frame and stores the resulting approximation of the current mesh in memory 126. The compressor keeps a copy of the current approximation of the vertices for one time increment, e.g., a frame, so that it can be used as a predictor of the mesh for the next time increment in the time-dependent geometry matrix, V.

The decompressor 122 also has a feedback loop that delays the most recently computed vertices for one time increment so that they can be used as a predictor for the next set of vertices. A transform module 140 in the decompressor applies de-quantized transformation parameters to the previously constructed mesh, temporarily stored in memory 142. The output of the transformation module 140 is the mesh of the previous frame transformed to the current mesh. An adder module 144 combines this transformed mesh with the de-quantized residual for the current frame from the compressed data stream to construct the current approximate vertices, V'.

The inverse transform coding method described above and illustrated in FIG. 3 can also be used in the feedback coder shown in FIG. 4. In this case, the transform match module 124, transforms the current mesh input into the coordinates of the approximate mesh of the previous frame. The compressor then computes the residual as the difference between the current mesh transformed to the coordinates of the previous frame and the approximate mesh for the previous frame. The compressor and decompressor reconstruct a current mesh from the residual by combining the approximate mesh of the previous frame with the transformed current mesh. Like the inverse mesh coder of FIG. 3, the resulting 3D position data is then transformed to its position in the current frame using the transformation parameters computed in the transformation match module 124. Unlike the coder of FIG. 3, however, the 3D transformation cannot be combined with the camera transformation. The current mesh must be transformed, without the camera transformation, and stored separately for use in predicting the position of the mesh for the next frame.

Column and Row Prediction and Sorting

Another way to exploit the geometric and temporal coherence in a matrix of time-dependent geometry is to perform prediction on the rows and columns of the matrix. As in the compression methods described above, a stream of time-dependent geometry can be expressed as a matrix of 3D geometric position data, where each row corresponds to a time sample such as a frame in an animation sequence, and each column is associated with a 3D position. The residual matrix that results from subtracting the original matrix from the compressed matrix (from using the methods described above) has the same form as the original matrix, and the compression techniques described in this section apply equally well to the residual matrix as to the original vertex matrix. Temporal prediction can be performed by pairing each row with another row or a reference row, computing the difference between each corresponding element in the two rows, and then encoding the difference between the rows by, for example, quantizing the difference values. Geometric prediction can be performed on the columns using a similar approach. Also, since the geometric connectivity among the 3D positions associated with each column is typically specified independently, the columns can be sorted such that the values of the corresponding elements in neighboring columns is as similar as possible.

Figure 5:
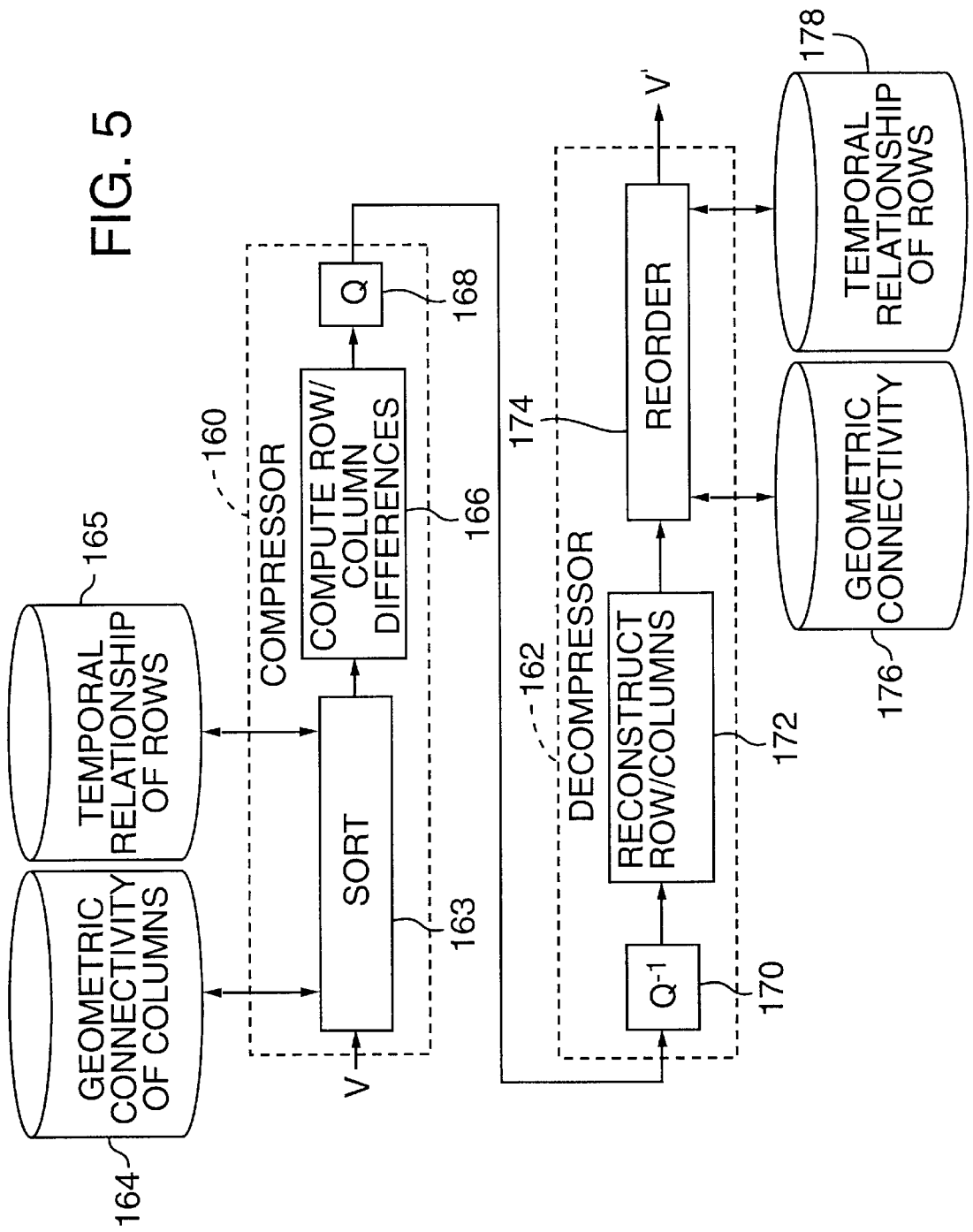
FIG. 5 is a block diagram illustrating an example of a matrix prediction coder.

FIG. 5 is a block diagram illustrating an example of a matrix prediction coder including both a compressor 160 and decompressor 162. The compressor 160 operates on a time-dependent geometry stream, which in this case, is the matrix of vertex positions, V. A sort module 162 in the compressor positions the columns or rows (or both) such that the neighboring columns/rows have corresponding elements that are more similar than the original matrix. In particular, the sort module 162 sorts the columns to make the neighboring vertex paths as similar as possible. This sorting process on the geometry attempts to place portions of the geometry that have coherent motion together. In the case where the 3D geometry is comprised of a series of rigid bodies, the columns are arranged into groups of rigid points that move together.

For more general vertex matrices, the sort module 162 operates on a measure of column similarity to find groups of columns that have similar motion. One such measure of similarity is to use the inner product of the mean-removed columns.

To compute this similarity measure:
1) Average each column in the matrix and store the result in a row vector, $\overline{V}$; and
2) Subtract the column mean value from each row, $\hat{V}_i = V_i - \overline{V}$ The sorter may then use the resulting similarity measure to sort the columns.

In the prototype, the similarity between columns i and j is computed in two ways: raw column dot product, $V^i \cdot V^j$, and sum of squared distances between column elements $(\Sigma(V_k^i - V_k^j)^2)^{1/2}$. Columns of vertices that are most similar are placed adjacent to each other. Starting at the left and moving to the right, the column sorter finds the most similar column from the remaining columns and swaps that column to be just to the right of the current column. Because the triangle list uses vertex indices and since each vertex is represented with a column, there is a level of indirection between the location in the matrix and the use of the column on output. This makes the column re-ordering transparent to the decoder. The encoder renumbers the indices in the triangle list to correspond to the sorted columns in the vertex matrix.

Row sorting can be done in a similar way to column sorting.

Vertices that move in similar paths are considered to be similar. This particular sort involves a linear sort on a 2D surface, so the best possible result is a path through the vertex matrix that fills the surface similar to a Peano curve, which is one class of "space-filling" curves. In other words, since the vertices lie on a 2D mesh, there is more coherence among neighbors than can be exploited than with a simple 1D sort, but a 1D sort can still improve the coherence and comes with low decompressor cost. A later section describes a sorting technique in more detail that improves coherence among the columns by clustering neighboring vertices via edge contractions.

The sort module 163 generally represents the process of sorting rows/columns of the matrix to improve the coherence of neighboring rows/columns. As the sort module 163 performs a sort on the column data, it updates the geometric connectivity data for the matrix so that it properly refers to the appropriate columns in the sorted matrix. The geometric connectivity data 164 defines the connectivity among vertex positions in the matrix. The data defines subsets of vertices within a mesh that are connected together and also maintains a reference between the vertex positions in its structure and the corresponding vertex positions in the matrix, V. When the sort module 163 changes the order of the columns, it updates the connectivity information so that the vertex position in the connectivity data refers to the appropriate column in the matrix, V.

In addition to spatial prediction, the compressor 160 also performs temporal prediction on the rows of the matrix of vertex positions. In the majority of cases, the neighboring rows in the matrix V are already arranged such that neighboring rows contain corresponding elements that are most similar. However, it is also possible to sort the rows such that neighboring rows are more similar than the original input matrix. It is also possible to select a reference row or reference rows that are used as a basis to predict motion of other rows. If the rows are sorted, the sort module 163 updates a data structure 165 that maintains the temporal relationship among the rows. This data structure can then be used to make sure that the mesh data can be reconstructed in the proper temporal order.

The compressor 160 performs row/column prediction by computing the difference between each corresponding element between a reference row/column and another row/column. Once sorting is complete, predictor module 166 computes the difference between each corresponding element in pairs of adjacent rows to perform row prediction, and between each corresponding element in adjacent columns to perform column prediction. The output of the prediction module 166 is a matrix of difference values. These difference values can then be quantized in quantizer module 168.

To decompress the compressed data stream, the decompressor 162 in FIG. 5 performs the reverse of the operations of the compressor 160. Specifically, dequantizer module 170 dequantizes the matrix of difference values. The matrix of difference values is then reconstructed to compute the original rows and columns of the sorted matrix in the inverse predictor module 172. The reorder module 174 reorders the columns in the case where they are sorted for column prediction, and also reorders the rows where they are sorted for row prediction. The geometric connectivity data 176 is used to reorder the columns. Similarly, the ordering of the rows as represented in the temporal data 178 is used to ensure that the geometric data is in the proper time sequence.

While the above example in FIG. 5 is illustrated in the context of a matrix, V, of vertex positions, row and column prediction can also be performed on other forms of the time-dependent geometry matrix. For example, as explained further below, a matrix of time-dependent geometric data can be decomposed into a matrix of basis vectors and another matrix of weights using principal component analysis. Row/column prediction, in this case, can be performed on the matrix representing the weights. It is also possible to use prediction on a matrix of the residual values computed in a mesh coder and on the base mesh.

Basis Decomposition Coder

Another method for compressing a matrix representing time-dependent geometry is to decompose the matrix into basis functions and weights using principal component analysis. Techniques for finding the best set of basis vectors for a matrix go by many names: PCA (principal components analysis), KL-transform (Karhunen-Loève), SVD (singular value decomposition.), etc. The SVD factors the vertex matrix V into UDW, where U and W are orthonormal matrices, and $D = \text{diag}(s_0, s_1, s_2, \ldots)$ is a diagonal matrix of singular values sorted by size. The size of the singular value indicates the importance of the corresponding basis vector. A basis vector is given by a singular value, $s_i$, and a row $W_i$. Each column $U^i$ gives the corresponding weights per frame. The following expression illustrates the decomposition of a matrix of vertex positions into a mesh of basis vectors and weights:

$$V_W = \begin{bmatrix} w_0^0 & \cdots & w_0^{k-1} \\ \vdots & & \vdots \\ w_{M-1}^0 & \cdots & w_{M-1}^{k-1} \end{bmatrix} \overset{\text{weights}}{} \begin{bmatrix} \hat{v}_0^0 & \cdots & \hat{v}_0^{N-1} \\ \vdots & & \vdots \\ \hat{v}_{k-1}^0 & \cdots & \hat{v}_{k-1}^{N-1} \end{bmatrix} \overset{\text{mesh basis vectors}}{}$$

The matrix on the left represents the weights, which are sometimes also referred to as coefficients. As in the original matrix of vertex positions, the matrix of the weights shown above has several rows corresponding to time increments and columns representing geometric positions. Similarly, the matrix on the right representing the mesh basis vectors includes a row for each time increment and columns representing basis vectors. If the number of important basis vectors is small, good compression can result by encoding and transmitting just the most important basis vectors, and then transmitting the weights per frame plus the residual from the rest of the basis vectors that were not encoded explicitly.

While principal component analysis can be performed on a full-size matrix of vertex positions for a 3D object, it is computationally expensive to decompose the full matrix, especially for complex objects. Thus, while one approach is to compute a full-sized singular value decomposition V=UDW with U of size nframe×nframe and W of size nvertex×nvertex, a better approach is to perform mesh simplification as a pre-processing step on the matrix and then perform basis decomposition. In this case, the original vertex matrix V is filtered down in space (using the Progressive Mesh approach) and time (using knot deletion or wavelet encoding) to a smooth version $V_S$, which is then factored as $V_S=U_S D_S W_S$. The basis vectors given by $D_S W_S$ are then expanded by the Progressive Mesh vertex split records as needed to get a basis for the fine-detail mesh. Similarly, the weights given by $U_S$ are expanded by the detail records in time (given by knot insertion or wavelet details).

Another approach is to use an approximate SVD coder which can iteratively compute a small rank approximation to the singular value decomposition, $V_K=U_K D_K W_K^T$ with $U_K$ of size nframe×K and $V_K$ of size K×nvertex.

Figure 6:
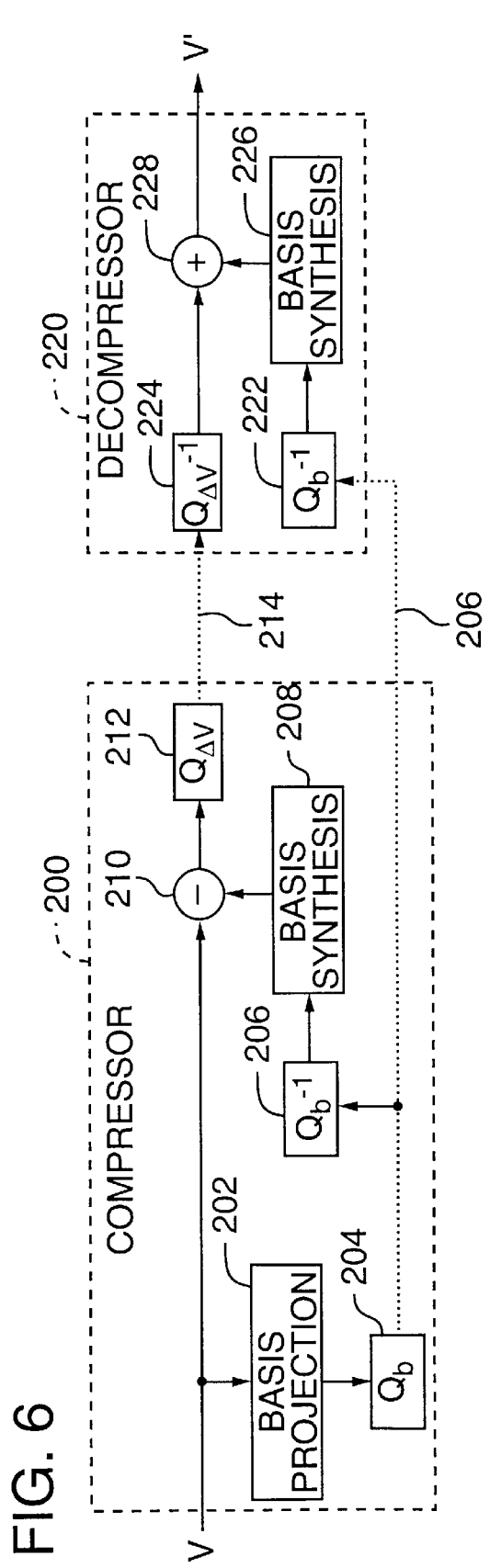
FIG. 6 is a block diagram illustrating a mesh basis coder that uses principal component analysis to compress a time-dependent geometry stream.

FIG. 6 is a block diagram illustrating a mesh basis coder that uses principal component analysis to compress a time-dependent geometry stream. The mesh basis coder shown in FIG. 6 projects a matrix of vertex positions, V, to a set of mesh basis vectors and then compresses the basis coefficients and the residual. In the compressor 200, a basis projection module 202 decomposes the current mesh into basis coefficients and basis vectors. Quantization module 204 quantizes the basis coefficients, which become part of the compressed data stream 206. Dequantizer module 206 dequantizes the basis coefficients for the current mesh. Basis synthesis module 208 reconstructs the current mesh from the dequantized basis coefficients and basis vectors. To compute the residual in the compressor, subtractor 210 computes the difference between the reconstructed mesh and the current mesh for each corresponding element. Finally, quantizer 212 quantizes the residual, and a quantized residual becomes a second part of the compressed data stream 214 along with the quantized basis coefficients 206.

To decompress the compressed data stream, the decompressor 220 reconstructs the current mesh from the coded residual and basis coefficients. Dequantizer 222 reconstructs the basis coefficients and dequantizer 224 reconstructs the residual. Basis synthesis module 226 approximates the current mesh by applying the dequantized basis coefficients to the basis vectors. Adder unit 228 then combines the approximate mesh from the basis synthesis module 226 with a dequantized residual to compute a reconstructed mesh.

Quantization

There are a variety of conventional quantization techniques that may be used to quantize the numbers representing components of the encoded time-varying geometry. To quantize the warp coefficients and residual, the compressor uses a three-range regular quantizer. See Allen Gersho and Robert M. Gray, "*Vector Quantization and Signal Compression,*" Kluwer Academic Publishers, 1991. The main range is for the signal within the standard deviation of the mean and the other two are for the lower and upper outliers. A first pass calculates the statistics of the signal, and the second pass does the actual quantization.

Spacetime Level of Detail

Mesh simplification techniques can be used to convert a matrix of 3D time-dependent geometry into a hierarchy of mesh refinements. Some examples of mesh simplification techniques include progressive meshes as described in "Progressive Meshes," Hugues Hoppe, pp. 99–108, SIGGRAPH '95 and "View-Dependent Refinement of Progressive Meshes," Hugues Hoppe, pp. 189–198, SIGGRAPH '97. For more information on progressive meshes, see the following U.S. patent application Ser. Nos.: 08/586,593, entitled, "Encoding and Progressive Transmission of Progressive Meshes," by Hugues Hoppe; 08/797,502, entitled, "Mesh Simplification and Construction of Progressive Meshes," by Hugues Hoppe; 08/7907,501, entitled, "Geomorphs and Variable Resolution Control of Progressive Meshes," by Hugues Hoppe; and 08/797,781, entitled, "Selective Refinement of Progressive Meshes," by Hugues Hoppe, which are hereby incorporated by reference in their entirety.

Quadric error mesh simplification is described in "Surface Simplification Using Quadric Error Metrics," Michael Garland and Paul S. Heckbert, pp. 209–216, SIGGRAPH '97.

Other mesh simplification techniques may be used as well, such as mesh simplification used in the MetaStream 3D file format from MetaCreations Corporation.

There are a number of benefits to using level-of-detail control in the compression of time-dependent geometry. By simplifying the mesh representing 3D geometry, level-of-detail control reduces the cost of encoding the time-dependent geometry considerably. The motion of the simplified geometry is a good approximation of the motion represented in the detailed mesh, and therefore, a simplified version of the geometry can be used to compute compression parameters such as affine transforms in a mesh transform coder and basis vectors in basis decomposition coder.

Another benefit of level-of-detail control is that it enables the compressor to change the topology of the mesh through time. Depending on where a particular 3D object is located in the scene and on how much it is changing, the time-dependent geometry of the object can be represented with higher or lower level-of-detail. Thus, a 3D object or a part of an object can be represented at varying levels of detail depending on its importance in an animation sequence at selected points in time.

By extending mesh simplification through time as well as space, an efficient representation of time-dependent geometry can be created. Specifically, mesh simplification can be extended to create a data structure representing time-dependent geometry as a pyramid in space and time. The pyramid represents the hierarchy of a 3D object's level-of-detail in both space and time. This space-time pyramid can be used as a form of compression because the hierarchical representation of the time-dependent geometry of an object is smaller than the original time-dependent geometry consisting of a mesh for each frame in an animation. The hierarchical representation is also efficient for transmission because refinement and coarsening records used to refine or coarsen the hierarchical representation can be transmitted instead of transmitting a mesh for each frame. As noted above, the hierarchical representation also makes other forms of compression described above more efficient because they can be designed to operate at the appropriate level of detail in the space-time pyramid.

Local Frames

As explained in further detail below, the hierarchical representation of the space-time pyramid can be represented using a series of expansion records. By encoding the expansion records in the local coordinates of the mesh surface, much of the motion can be carried along to the fine detail. This local encoding has a number of benefits, including hierarchical control of the mesh shape and hierarchical quantization (where the fine detail is coded with fewer bits). The benefits are similar to the benefits achieved in subdivision schemes, such as the ones described in "Interpolating Subdivision for Meshes with Arbitrary Topology", Denis Zorin, Peter Schroeder, and Wim Sweldens, pp. 189–192, SIGGRAPH '96; "Interactive Multiresolution Mesh Editing", Denis Zorin and Peter Schröder and Wim Sweldens, pp. 259–268, SIGGRAPH '97; and "Multiresolution analysis for Surfaces of Arbitrary Topological Type", Michael Lounsbery, Tony D. DeRose, and Joe Warren, pp. 34–73, ACM Transaction on Graphics, volume 16, January 1997. However, in the context of time-dependent geometry, the coherence in the local coordinate system is even greater through time.

In the current implementation, the hierarchy of the space-time pyramid is created by factoring the matrix of time-dependent vertex positions into: 1) contracted sets of geometry, and 2) expansion records. The following expression shows how the matrix of vertex positions is factored into a matrix of contracted vertex columns and vertex expansions.

$$V_E = \begin{bmatrix} \overbrace{v_0^0 \ldots v_0^{j_1-1}}^{\text{contracted vertex columns}} & v_0^{j_1} \ldots v_0^{j_2-1} & \cdots & v_0^{j_{N-1}} \ldots v_0^{n-1} \\ \vdots & & & \vdots \\ v_{m-1}^0 \ldots v_{m-1}^{j_1-1} & v_{m-1}^{j_1} \ldots v_{m-1}^{j_2-1} & \cdots & v_{m-1}^{j_{N-1}} \ldots v_{m-1}^{n-1} \end{bmatrix} \begin{bmatrix} D \end{bmatrix}^{\text{vertex expansions}}$$

Each of the contracted vertex columns represents a delta between a pair of neighboring levels in the spatial hierarchy.

The vertex expansions include an expansion record for each corresponding contracted vertex column indicating how the contracted vertex column can be expanded to restore to an approximation of the original matrix.

The vertex of matrix positions can also be factored into time expansions and a matrix of contracted vertex rows as set forth in the following expression:

$$V_T = \begin{bmatrix} T \end{bmatrix}^{\text{time expansions}} \begin{bmatrix} \overbrace{v_0^0 \ldots v_{k_1-1}^0}^{\text{contracted vertex rows}} & \cdots & v_0^{n-1} \ldots v_{k_1-1}^{n-1} \\ v_{k_1}^0 \ldots v_{k_2-1}^0 & & v_{k_1}^{n-1} \ldots v_{k_2-1}^{n-1} \\ \vdots & & \vdots \\ v_{k_{M-1}}^0 \ldots v_{m-1}^0 & \cdots & v_{k_{M-1}}^{n-1} \ldots v_{m-1}^{n-1} \end{bmatrix}$$

In the above expression, the rows represent deltas between neighboring pairs of a hierarchy in the time dimension. The time expansions T include time expansion records corresponding to each contracted vertex row that define how the corresponding row can be expanded to restore it to an approximation of the original matrix.

Combining the concepts of the previous two expressions, the matrix of vertex positions can be factored into time expansions, a matrix of contracted vertex blocks, and vertex expansions as set forth in the following expression.

$$V_{TE} = \begin{bmatrix} T \end{bmatrix}^{\text{time expansion}} \begin{bmatrix} \overbrace{\overline{v}_0^0 \cdots \overline{v}_0^{N-1}}^{\text{contracted vertex blocks}} \\ \overline{v}_1^0 \quad \overline{v}_1^{N-1} \\ \vdots \quad \vdots \\ \overline{v}_{M-1}^0 \cdots \overline{v}_{M-1}^{N-1} \end{bmatrix} \begin{bmatrix} D \end{bmatrix}^{\text{vertex expansions}}$$

The contracted vertex blocks represent deltas between a neighboring column and row in the space-time hierarchy.

Refinement Basis Coding

The current implementation uses a mesh refinement technique to create a series of edge-contraction/vertex-split records. To decrease the level of detail of a mesh, edges interconnecting the vertex positions are collapsed to create a mesh with fewer vertices. Conversely, to increase the level of detail of a mesh, vertex positions are split into additional positions to create a more detailed mesh. By separating the sets of delta values from the topology of the mesh refinements, the implementation obtains a refinement matrix of the following form:

| | $Split_0$ | | $Split_1$ | | $Split_{n-2}$ | | $Split_{n-1}$ | |
|---|---|---|---|---|---|---|---|---|
| | $D_{0,0}$ | $D_{0,1}$ | $D_{0,2}$ | $D_{0,3}$ | $\ldots$ $D_{0,2n-4}$ | $D_{0,2n-3}$ | $D_{0,2n-2}$ | $D_{0,2n-1}$ |
| | $Dp_{m-1,0}$ | $D_{m-1,1}$ | $D_{m-1,2}$ | $D_{m1,3}$ | $\ldots$ $D_{m-1,2n-4}$ | $D_{m-1,2n-3}$ | $D_{m-1,2n-2}$ | $D_{m-1,2n-1}$ |

The matrix above represents a vertex expansion list. The top row of the matrix denotes splits in the spatial hierarchy of the time-dependent geometry. Subsequent rows in the matrix correspond to increments of time. Columns in the matrix correspond to delta values between neighboring levels of hierarchy in the spatial domain.

In the current implementation, the contraction coefficients run from right to left and, conversely, expansion coefficients run from left to right. Due to the structure of the refinement procedure, the magnitudes of the delta vectors stored at each element in the matrix decrease from left to right. Intuitively, this is because the first edges to be collapsed perturb the original mesh the least, by design. There is more signal strength on the left hand side of the matrix, and it becomes progressively smaller from left to right in the matrix.

The refinement matrix can be used to improve the efficiency of the compression methods described above, and specifically, the geometric transform method and the basis decomposition method. In a test case, for example, the current implementation of the mesh refinement method converted an original mesh having approximately 3000 vertices into a refinement matrix. The affine transformation coefficients computed in the prototype geometric transform coder and the basis vectors as computed in the prototype basis decomposition coder became more tractable by using only 300–1000 elements on the left hand side of the refinement matrix. In effect, this mesh simplification performs a low-pass filter on the mesh in the perceptual advantageous way.

The particular ordering of the elements in the expansion list is determined by the optimization criteria used during the mesh simplification process. The current implementation uses the quadric-error measure Progressive Mesh technique on the mesh of the first frame of the animation and applies the result to the rest of the rows in the original time-dependent matrix of the geometry data. This approach is reasonably fast and accurate. However, in the dynamic compression context, this particular ordering may not be optimal for the entire animation sequence. To find a more optimal ordering, the dependency graph of vertex splits can be used to re-order the expansion records with compression and fidelity measures such as the quadric-error measure used at the same time. In other words, the dependency graph of vertex splits determines which split columns can be reordered and which cannot due to dependencies on splits of vertices further to the left in the matrix. A more general approach would be to search for the particular Progressive Mesh (PM) expansion that gives the best compression/best visual quality. For a particular moment in time (in other words, for a given row in V), the Progressive Mesh approach finds the best sequence of vertex collapses to match the spatial geometry of the lower level of detail mesh to the spatial geometry of original mesh. For time-dependent geometry, to measure the quality of a particular PM requires summing the error in the geometry over the time dimension (in other words, over the rows of original vertex matrix V) for each level of detail of the PM.

For example, a PM can be computed for each row of V and then tested over all the rows of V for geometric accuracy. Or a PM can be computed for the average mesh obtained by taking the average of the columns of V.

Examples Illustrating Operation of the Space-time Coder

To help explain the space-time coder, take the example of a human character. From a distance, all that is needed is the translation and rotation of the whole body at low polygon count, with limbs rigidly fixed. As the character gets closer, the gross movement and shape of the limbs is needed to convey the proper perception of the motion. As the character gets even closer, the fine detail in the movement and shape of the face and other muscles becomes important. As the character then recedes, less detail is needed, in reverse order of the steps listed above. To achieve the appropriate gradual increase and then decrease in detail, the space-time codec transmits first a simple geometric representation of the model and a simple version of the animation. Then, based on the viewpoint of the client, the server streams down spatial and temporal detail updates as needed.

In this context, the server refers to the system entity that acts as the source of time-varying geometry, and the client refers to the entity where playback occurs. Within this broad context, there is a wide range of potential applications to reduce bandwidth and memory requirements. The server and client may be software processes executing on the same or different processors. The server may be a software module executing on a host processor and the client may be a graphics co-processor in a computer system. The server may be software executing on a first computer, and the client may be a hardware device or software module executing in a second computer, which is connected to the first computer via a modem connection, a local area network or wide area network.

Derivation of the space-time pyramid

Figure 7:
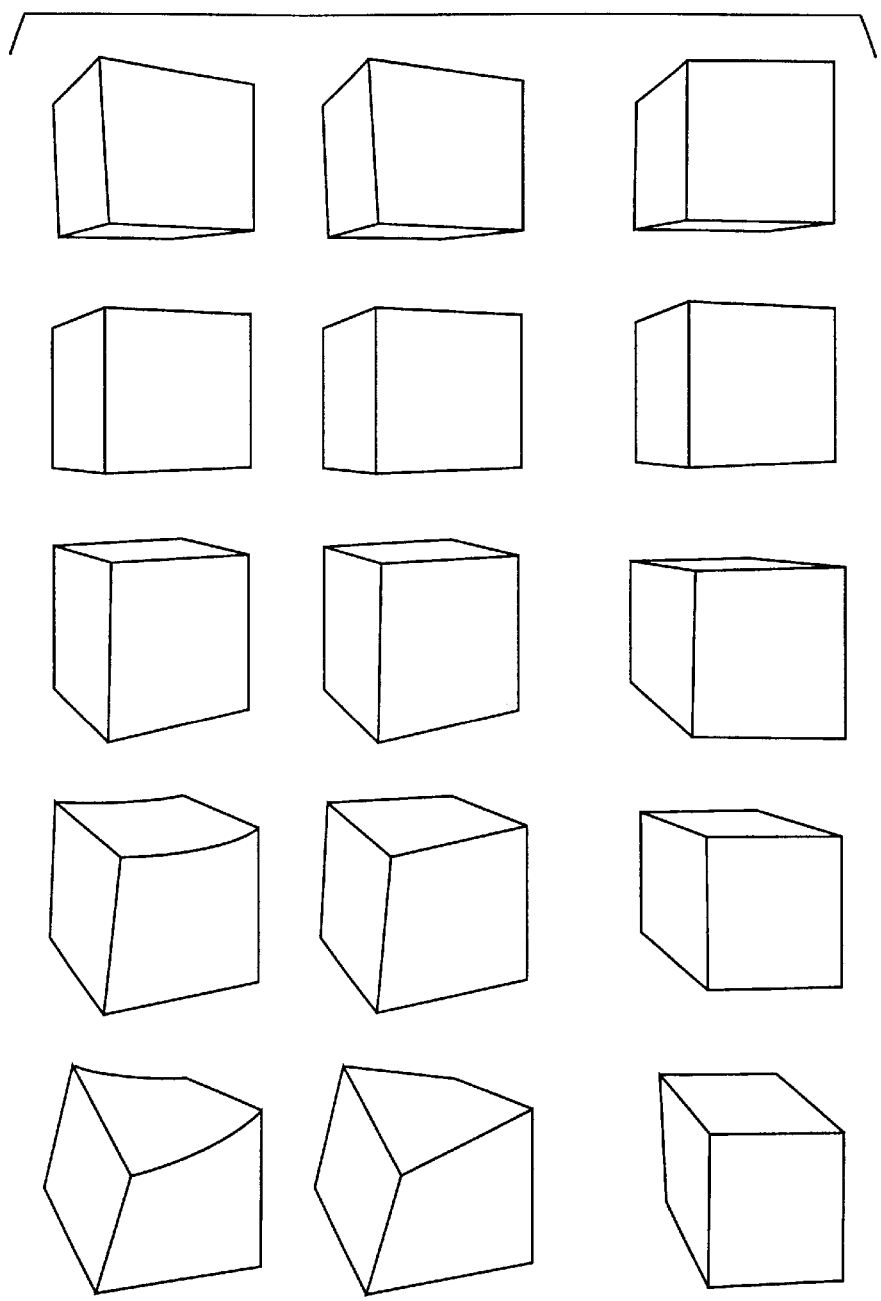
FIG. 7 is a diagram illustrating an animation sequence of a twisting and translating cube. Aspects of the animation are depicted in separate rows of frames: 1) the bottom row depicts the cube geometry with simple translation from left to right; 2) the middle row depicts an intermediate form of the animation where the top of the cube is rotating faster than the bottom of the cube, yet the sides of the cube remain straight; and 3) the top row shows more complex curving motion of the cube in which its vertices are rotating progressively faster from the bottom to the top of the cube.

The input is a densely time-sampled set of meshes $M(0), \ldots, M(n-1)$. As discussed above in previous sections, the positions of the vertices can be considered as a matrix, V. Each row i of V corresponds to a single time sample $V_i=M(i)$. Each column j of V is a trajectory of a coordinate through time. The space-time pyramid is a decomposition of V along the two dimensions of space (across the columns) and time (across the rows). To make the discussion concrete, consider a simple one-second animation of a cube moving from the left to the right, with the top of the cube twisting periodically relative to the bottom around a vertical axis. This animation is illustrated in FIG. 7. The top and bottom of the cube remain as squares aligned to the x-z plane, but the sides of the cube curve as the y-twist of the top increases and decreases as shown in the top animation sequence in FIG. 7. The animation is sampled in time at 60 Hz to get 60 initial meshes $M(0), \ldots, M(59)$. The top vertices are $V0$ to $V3$ and the bottom vertices are $V4$ to $V7$. The rest of the vertices encode the twisting sides of the cube.

The first step is to segment the mesh into factors that are animated independently and then combined with an animation expression. For the cube, the desired animation expression is:

$$\text{Translation} * (\text{Cube} + \text{YRotation}(k) * \text{CubeY}(k)), \quad (A)$$

where $$\text{YRotation}(k) = \text{AxisRotation}(\text{YAxis}, \text{Interp}(k, \text{alpha}(k) * \text{TopTheta})). \quad (B)$$

Each of the k terms encodes a segment of the mesh with a different speed of rotation. The bottom segment matches the bottom of the cube and is stationary. Going from bottom to top, the speed of each segment gradually increases up to the top segment that matches the y-rotation of the top of the cube.

To obtain this animation expression from the raw input sequence, a list of geometric transform encoding steps is applied to the mesh. An example list is the mean-value trajectory of the current V matrix, then a series of affine-match geometric encodings. The mean of each row of the V matrix mesh gives the trajectory of the center of mass, which gives the Translation term of the animation expression. The translation of the cube is illustrated in the bottom animation sequence of FIG. 7.

Then, a series of affine-match geometric transform encodings matches the rest of the vertices that are rotating about the y-axis. A y-rotation term that is matched to the entire vertex matrix will match well with the center of the cube, since the vertices near the center of the cube move with the average rotation. The encoding starts from the center of the y-axis, and then moves outwards up to the top and down to the bottom, based on the quality of the match to the next recovered term in the animation expression. This gives an animation expression of the form:

$$\text{Translation} * (\text{Cube} + \text{YRotation}(0) * (\text{CubeY}(0) + \text{YRotation}(1) * (\text{CubeY}(1) + \ldots \text{YRotation}(N-1) * \text{CubeY}(N-1)). \quad (C)$$

A simple algebraic simplification reduces this to the desired animation expression (A).

The detail terms can be encoded in space or in time, as described in the next two paragraphs. The job of the encoder is to choose, at each step in the encoding sequence, the dimension with the most coherence. This is performed by exploring both dimensions and choosing the detail smoothing with the best prediction.

The spatial dimension of each segment is coded using progressive mesh edge collapses using a typical mesh, which is either the first in the sequence or the initial unanimated mesh (also called the rest shape). An edge collapse combines two columns of V into a single column and encodes a delta to recover the original columns.

The temporal dimension of each segment is coded in two ways. For sparse and smooth data, the vertex positions and animation coefficients are splined through time. Higher level of detail is added by inserting a new spline vertex between two existing ones to give the motion a new local feature. One form of inserting such a vertex is called knot insertion. A time-edge collapse combines two rows in the current segment and encodes a row delta to recover the original rows. For dense animation, wavelets are used and higher level of detail is added with more detail coefficients. For smooth transitions between levels of detail, the client side representation is blended with the new detail coefficients while retaining the smoother coefficients.

Figure 8:
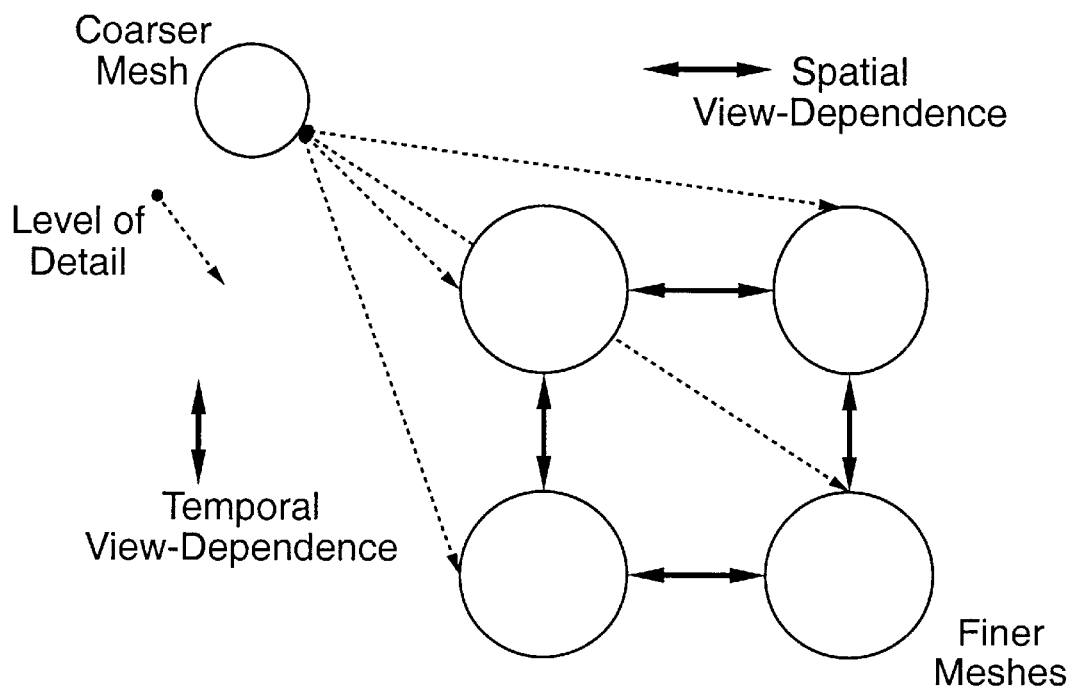
FIG. 8 is a diagram illustrating the structure of a space-time pyramid between levels of detail in both space and time.

Given a desired view-dependent resolution in space and time, checkpoints are saved and the encoding begins recursively in each dimension. This produces a pyramid lattice of meshes. The links between each node in the lattice are the series of updates needed to move from one to the other. FIG. 8 shows one level of the pyramid. This structure is repeated to produce the full pyramid.

Examples of the data structures used in the space-time coder are provided below. The data structures are categorized based on whether they reside on the server or client, or are sent between the client and server during selective playback of a 3D-animation sequence.

Format of the client-side data structures:

The following data structures are used to represent animation in the client.

```
// triangular mesh for a single point in parameter space
struct Mesh {
    int m_vertex;      // number of vertices
    int m_ndim;        // number of vertex dimensions (x,y,z + others)
    float *m_avertex;  // nvertex * ndim array of vertices
    int m_ntri;        // number of triangles
    int (*m_aitri) [3]; // triangle indices into m_av
};
// one dimensional spline
struct Spline1D {
    int m_nsample;     // number of samples in time
    struct Sample1D {
        float m_t;         // time value
        float m_av[0]      // ndim array of values
    } m_asample[0]     // array of variably spaced samples
};
// affinely transformed segment
struct AffineVertexSegment {
    // we have two gather/scatter dimensions: vertex indices and vertex
    values
    int m_nvertex;     // <= nvertex
    int *m_aivertex;   // indices of affected vertices
    int m_ndim;        // <=ndim of vertex
    int *m_aidim;      // indices of affected dimensions
    float *m_av;       // nvertex * ndim values of rest shape
    Spline1D           // ndim * (ndim + 1) splined coefficients of
    *m_xfm;            affine
    transform
    Spline1D           // nvertex * ndim splined residuals
    *m_avs;
};
```

-continued

```
// affinely transformed mesh
struct MeshAffine1D {
    Mesh m_mesh;       // current mesh
    int m_nsegment;    // number of affinely transformed segments
    AffineVertexSegment // list of affinely transformed segments
    *m_avs;
};
```

Format of the server-to-client data structures:

The server may communicate the following data structures to the client to update the animation on the client during selective playback.

```
/*
// Textual representation of stream of update records.
// Connectivity updates
mesh imesh nvertex ndim      // index and size of mesh
segiv imesh iseg seg_nvertex iv(0) . . . iv(seg_nvertex-1)     // list
of active vertices
segdim imesh iseg seg_ndim idim(0) . . . idim(seg_ndim-1)      // list
of active dimensions
triset imesh itri iv0 iv1 iv2  // triangle vertex indices
tridel imesh itri              // delete indexed triangle
// Vertex initialization and deletion
vset imesh iv v(0) v(1) . . . v(ndim-1) // initialize vertex position, normal,
uv's, etc
voffset imesh iv ivsrc dv(0) dv(1) . . . dv(ndim-1)    // initialize vertex
from previous vertex
vdel imesh iv                  // delete indexed vertex
// Segment position/time updates
segxfm imesh iseg t xfm(0) . . . xfm(seg_ndim * (seg_ndim+1) - 1)
segresid imesh iseg iv t dv (0) . . . dv(seg_ndim-1)
*/
// update structures
struct UpdateTriangle {
    int m_itriangle;       // index of triangle to add/update
    int m_aivertex[3];     // list of vertex indices
};
struct UpdateDeleteTriangle {
    int m_itriangle;
};
struct UpdateSetVertex {
    int m_ivertex;         // index of vertex to add/set
    float m_afvertex[0];   // size ndim array of vertex values
};
struct UpdateOffsetVertex {
    int m_ivertex;         // index of vertex to add/offset
    int m_ivertexSource;   // index of source vertex
    float m_adfvertex[0];  // size ndim array of delta vertex values
};
struct UpdateDeleteVertex {
    int m_ivertex;         // index of vertex to delete
};
struct UpdateSegmentActiveVertices {
    int m_isegment;        // index of segment to add/update
    int m_nvertex;         // number of active vertices in list
    int m_aivertex[0];     // list of active vertex indices
};
struct UpdateSegmentActiveDimensions {
    int m_isegment;        // index of segment to update
    int m_ndim;            // number of active dimensions
    int m_aidim[0];        // list of active dimensions
};
struct UpdateSegmentXfm {
    int m_isegment;        // index of segment to update
    float m_t;             // parameter position
    float m_afxfm[0];      // size seg_ndim * (seg_ndim + 1) array
                            of xfm values
};
struct UpdateSegmentResidual {
    int m_isegment;        // index of segment to update
    int m_ivertex;         // index of vertex within segment
    float m_t;             // parameter position
    float m_afvertex[0];   // size seg_ndim array of vertex values
```

-continued

```
};
// Typed union of all the update structures
struc Update {
    int m_cb;           // size of whole update record
    int m_type;         // type of update
    union {
        UpdateTriangle triset;
        UpdateDeleteTriangle tridel;
        UpdateSetVertex vset;
        UpdateOffsetVertex voffset;
        UpdateDeleteVertex vdel;
        UpdateSegmentActiveVertices segiv;
        UpdateSegmentActiveDimensions segdim;
        UpdateSegmentXfm segxfm;
        UpdateSegmentResidual segresid;
    };
};
```

Format of the server-side data structures:

The following data structures are maintained on the server in connection with the selective playback of animation in the client.

```
struct UpdateBlock {
    // directions to move to get to the next level of detail
    #define TIME_FINE       0
    #define TIME_COARSE     1
    #define TIME_NEXT       2
    #define TIME_'PREV      3
    #define SPACE_FINE      4
    #define SPACE_COARSE    5
    #define SPACE_X         6
    #define SPACE_Y         7
    #define SPACE_Z         8
    UpdateBlock *m_pStep[9];  // blocks of update records
corresponding to finer and coarser levels of detail in space and time
    int m_nupdate;            // number of update records in this
block
    Update **m_apupdate;      // array of pointers to update
records
};
struct ServerMeshAffine1D {
    MeshAffine1D m_meshClient;  // the server keeps
track of what the client has to compute the appropriate update sequences
    UpdateBlock *m_pUpdateBlock;  // current position in the
space-time pyramid
};
```

During transmission of animation, the following communication takes place between the server and the client:

| | |
|---|---|
| server←client | spatial resolution, current view |
| server→client | spatial update records (e.g., progressive-mesh style vertex splits and edge collapses) |
| server←client | temporal resolution, current time interval |
| server→client | temporal update records (parameter curve knot insertions and deletion, or blocks of wavelet detail coefficients) |

The client sends the server the current viewpoint of a segment along with the desired spatial resolution. The spatial resolution indicates the geometric level of detail at which the client will render the segment. In response, the server provides the spatial update records that enable the client to extract the desired geometric level of detail from the space-time pyramid.

To specify the rate at which the segment is updated, the client sends the temporal resolution and current time interval to the server. In response, the server sends the temporal update record(s) that enable the client to extract the desired temporal level of detail from the space-time pyramid.

Encoding Across Other Dimensions

Time has been used throughout this document as a representative dimension. Instead of just playing back a linear sequence, this dimension may be used for interactive controls. For example, the detailed animation of an elbow bending (with bulging muscle, sliding skin, etc.) is parameterized by the joint angle of the elbow. By allowing the user to specify the joint angle, and decompressing the animation sequence appropriately, the user can control the highly detailed animation. This is useful in interactive applications such as games.

In this particular example, the animation of the bending elbow may be represented in a space-angle matrix structure. Each column represents a position in the 3D mesh of the elbow object and the rows represent an angular position of the elbow joint. Like time, the joint angle may be represented in a hierarchical fashion from a low level of detail (e.g., few joint angle samples) to a high level of detail (e.g., many joint angle positions representing detailed bending of the elbow). During selective playback, the client requests an appropriate level of detail for angular motion, and in response, the server sends the corresponding update records for the joint angle dimension (either coarsening or refining) to animate the movement of the elbow at the appropriate level of detail. For example, the user may specify the angular position of the elbow joint through an input device, such as a joy stick. The client then calculates the angular position and sends it to the server, which returns the appropriate update record.

A similar approach may be used to encode 3D animation along other dimensions (e.g., rotational motion about some axis, translation motion along an axis, movement along a curved path, etc.).

Combined Compression of Texture and Geometry

In addition to the vertex positions, each vertex may also be associated with other data, such as texture coordinates, which may be compressed using the same techniques described for the 3D vertex positions. In a texture map operation, a graphics rendering system maps a 2D image to the surface of a 3D object. The texture coordinates for each vertex of the object represent the corresponding position of that vertex in the 2D texture space. When computing pixels in an output image, the graphics rendering system uses the texture coordinates to locate the appropriate texture sample or samples in the texture image for each pixel. Depending on the form of the texture map operation, the graphics rendering system may filter texture samples before applying the resulting color values to the output pixel. The texture coordinates may be expressed in a similar matrix form as a mesh of 3D vertex positions, except that texture coordinates represent a position in 2D rather than 3D space. Because of the similarity of the structures, the same compression techniques applied to a matrix of time-varying 3D geometry also apply to matrix of texture coordinates.

Typically, texture coordinates are static, but this is not required. For example, an image of the ripples of water in a river can be made to move downstream by simply animating the texture coordinates. In particular, the texture coordinates for a particular vertex may be expressed as a function of time. The combination of animated geometry and animated textures is compelling for a large class of visual effects. New applications of changing texture coordinates may arise given the foundation of animated geometry compression.

A representation for level of detail preferably should include both geometry coordinates and texture images. If the geometric level of detail is low, it is sufficient to use a corresponding low level of detail for the texture images. The spatial resolution of a texture image may be encoded in hierarchical fashion with varying levels of spatial resolution, possibly corresponding to geometric levels of detail in the space-time pyramid. In the context of selective playback, the server may initially send the lower detail coefficients of the texture images, and then send higher levels of detail as necessary to refine the texture image for viewpoints where finer detail is desired. By combining the update of both image and geometry, tradeoffs can be made depending on which is more important at a given resolution. For animated texture images, this tradeoff may be made in temporal as well as spatial detail.

Higher-Order Surfaces for Temporal and Spatial Encoding

In the initial presentation of the densely sampled vertex matrix, V, the two interpolation matrices S (through time) and G (through space) were assumed to be defined by the graphics system to get the continuous position matrix, P=SVG. However, if S and G are initially given as constant interpolation or linear interpolation, it is useful to derive higher-order interpolators S' and G' from V, particularly since modern graphics hardware includes support for higher order geometric interpolation, such as spline and subdivision surfaces.

Estimating the best S' and G' is done from the bottom up. First, small neighborhoods in time and space are chosen at random and fit with the local best matching spline surface of a given order. Then, by repeatedly growing and coalescing the neighborhoods with the best match to the next level up, a local greedy optimum for S' and G' is found. This is similar to the triangle segmentation described previously, but uses the spatial coordinates as well as the temporal to decide the extent of the matched region.

Even if the higher-order interpolators do not match precisely, they can be used as predictors of how the surface moves in time or changes spatially from point to point. A residual, R=SVG−S'V'G', can be used to recover the original matrix, P=S'V'G'+R.

Displacement-Map for Encoding of Residual

Most graphics hardware includes texture mapping hardware to efficiently map a 2D color image to the surface geometry of a shape. Modern graphics hardware also includes "bump" mapping, where the 2D image perturbs the normals of the shape rather than the color to get interesting lighting effects. Some modern graphics hardware also includes "displacement" mapping, where a 2D image of offsets perturbs the positions of the shape.

By transforming the residual of the time-dependent geometry coder to the local coordinates of the surface, displacement mapping can be used to apply the residual to the decompressed surface. The time-dependent residual can be computed by blending multiple residuals encoded as displacement maps. Since the graphics system has high-speed data paths and fast vertex processors, the graphics system is an effective place to apply the final residual correction to the decompressed shape. This is a particularly effective technique when combined with the higher-order surface encoding mentioned previously.

Example Implementation

Figure 9:
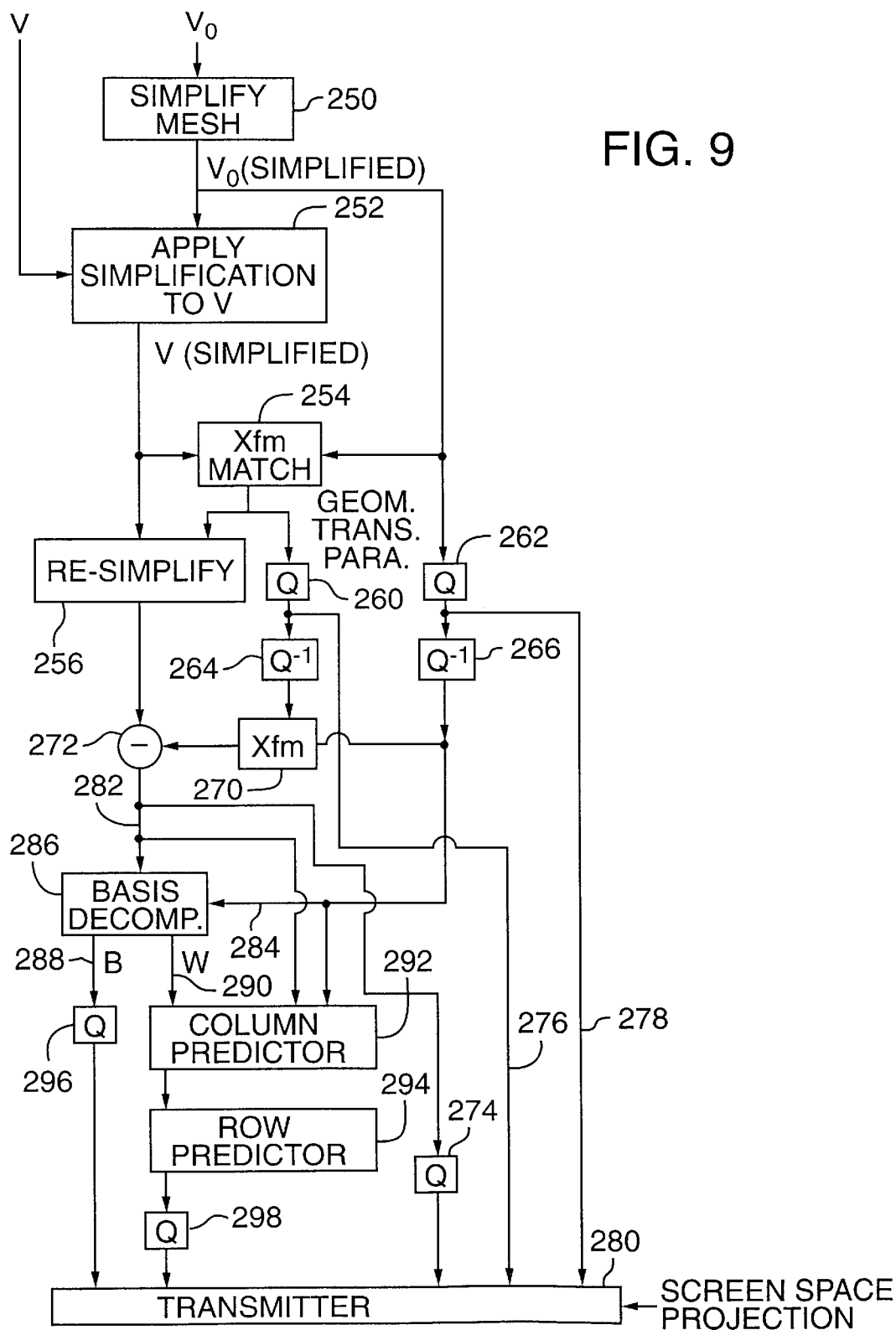
FIG. 9 is a block diagram illustrating a prototype compressor of time dependent geometry that combines mesh transform coding, basis coding, mesh simplification and row/column prediction coding.
Figure 10:
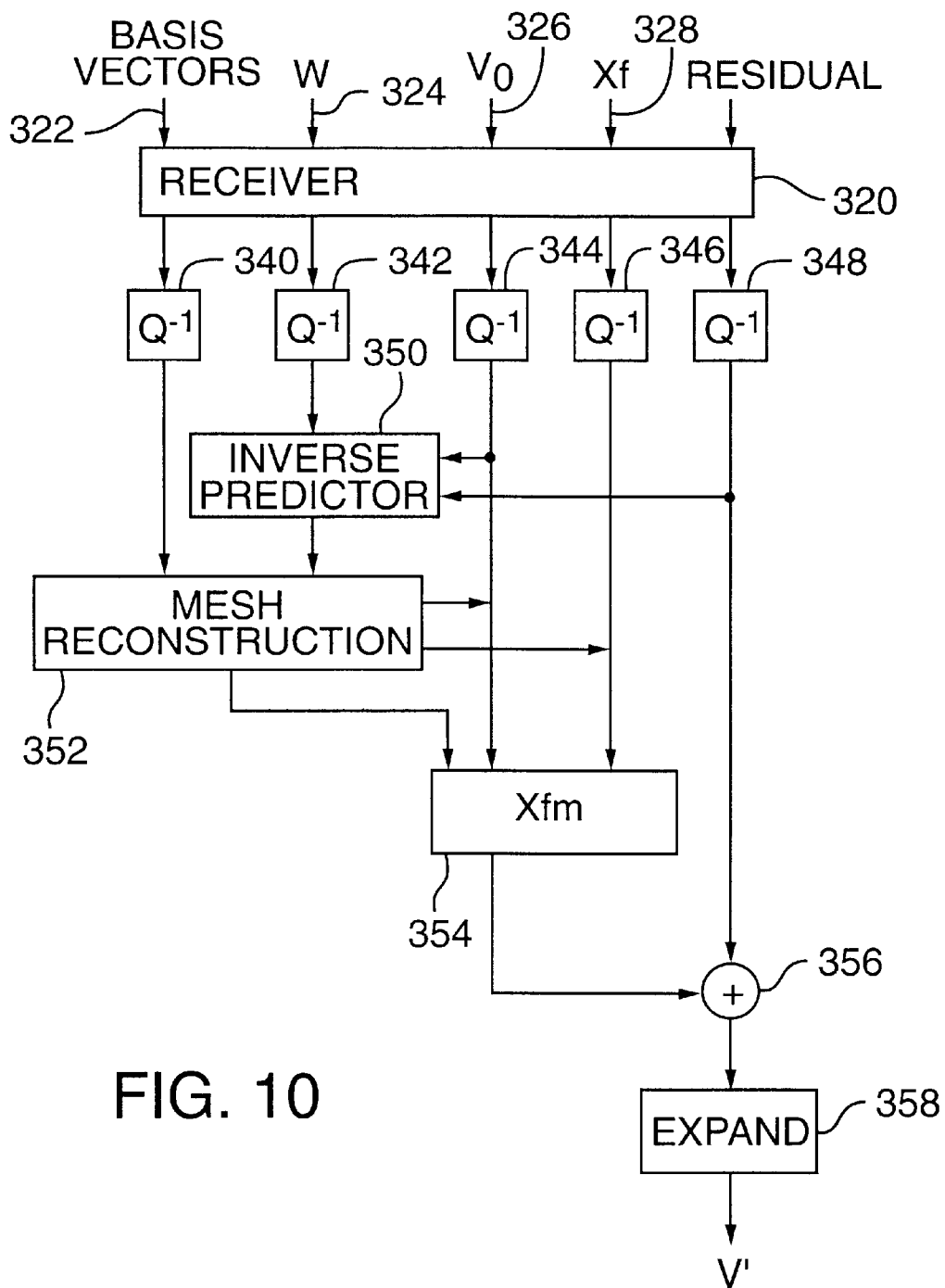
FIG. 10 illustrates a block diagram of a decompressor for compressed time-dependent geometry produced by the compressor of FIG. 9.

The current implementation uses a combination of the compression methods above to compress a matrix of vertex positions representing time-dependent geometry. FIG. 9 is a block diagram illustrating the compressor in this implementation, and FIG. 10 is a block diagram illustrating the decompressor.

As shown in FIG. 9, the process of compressing a stream of time-dependent geometry, represented by a matrix of vertex positions V, begins by simplifying the time-dependent meshes. In the current implementation, the mesh for the first frame of the animation is used as a base mesh. As noted above, however, the base mesh may be determined in a variety of alternative ways, including being predefined by the author of the model, being derived from an average of a series of meshes in the matrix V, etc. The current implementation uses the quadric-error measure approach on the mesh of the first frame of the animation to produce a set of pair contractions in the form of one of the rows in the table of the refinement matrix above. The simplified mesh block 250 in FIG. 9 represents the routines used to implement Garland's quadric-error measure technique for a mesh of vertex positions.

The set of pair contractions that result are then applied to the rest of the rows of the original time-dependent vertex matrix, V, to produce the refinement matrix as shown in block 252. The refinement matrix is "rolled forward" through the expansion records to create a simplified version of each of the original meshes in the matrix V.

The simplified meshes from block 252, including the simplified base mesh, are used to find the best affine match between the base mesh and each of the other meshes in the matrix V. Each of the meshes in the matrix V corresponds to the time sample in the animation sequence, namely, a frame in the animation. Transform match block 254 represents routines used to compute a set of affine transformation coefficients for each frame. These routines use the lower level of detail vertex matrices to compute an approximation of the least-square solution to $A_K \hat{V}_0 = V_K$. Transformation block 254 also includes routines for performing the method of normal equations to solve for the transformation coefficients, which includes the accumulation and inverting of a 4×4 fitting matrix for the base mesh, and the matrix product of an n×4 matrix with the fitting matrix as follows:

$$K = V_0^T (V_0 V_0^T)^{-1}$$

$$A = VK$$

In the current implementation, each of the meshes in the time-dependent matrix of vertex positions, V, is represented in its local coordinate system. While this improves the coherence of the motion of the meshes through time, it can also increase the computational complexity of the compressor. Since the meshes in the refinement matrix are represented in local coordinates, they need to be transformed to global coordinates (in other words, the mesh needs to be transformed). In the current implementation, this is addressed by re-simplifying each of the meshes in their new coordinates once the affine transform coefficients are calculated.

An alternative way to convert the refinement matrix to the new coordinate systems is to transform the delta values in the expansion records from their respective local coordinate systems to the new global coordinate system. Block 256 in FIG. 9 represents the process of applying the mesh simplification routines of Blocks 250 and 252 to each of the meshes in the new coordinate systems.

Next, the compressor computes a residual as the difference between each of the meshes and a transformed base mesh, computed using the affine transformation coefficients corresponding to each mesh. Both the affine transformation coefficients and the simplified base mesh are quantized and then dequantized as shown in quantizer blocks 260, 262, and dequantizer blocks 264, 266. Geometric transformation block 270 represents a routine for applying affine transformation coefficients for a current mesh to the base mesh to compute a transformed base mesh. The difference between the transformed base mesh and the corresponding simplified mesh is then computed as shown by subtractor block 272.

To further compress the time-dependent geometry, the current implementation supports basis decomposition coding as an option. Note that the quantized residual (the quantization block 274), affine transform coefficients 276, and base mesh 278 can be sent directly to a transmitter 280 at this stage. However, for some animation, basis decomposition can provide additional compression of the 3D geometry matrices, including the residual matrix 282 and the matrix representing the simplified base mesh 284.

The basis decomposition block 286 represents the process of decomposing a matrix into its basis vectors 288 and weights (also referred to as coefficients) 290. The current implementation uses a truncated version of the refinement matrix to compute a set of basis functions and weights. This step is optional because certain classes of motion do not lend themselves to decomposition but still have a great deal of spatial and temporal coherence in the refinement matrix. Thus, it is possible to bypass the basic decomposition step and perform column and/or row prediction on the refinement matrix of the residual.

In the case where basis decomposition is performed on the refinement matrix of the residual, the weights are passed through a column and row predictor as shown in Blocks 292, 294. Alternatively, if basis decomposition is not applied, the flat refinement hierarchies are passed through the column and row predictors. The compressor applies regular quantization to the basis vectors and to the output of the predictor blocks as shown in quantizer blocks 296 and 298.

While the compressor encodes the entire refinement hierarchy representing the time-dependent geometry stream, it is not necessary to transmit the entire hierarchy at run time to the decoder. Instead, only those spatial refinements that are needed for a given viewpoint in an animation need to be sent and updated. Similarly, temporal refinements are only necessary to the extent that a change in the position of the geometry is visible in the animation. The transmitter 280 can be adapted to determine which temporal and spatial components of the time-dependent geometry need to be transmitted. For instance, the transmitter can evaluate screen space projections of the model represented by the time-dependent geometry stream to determine the spatial and temporal refinements that need to be sent for a given viewpoint in the animation sequence.

FIG. 10 is a block diagram illustrating a decompressor for decoding the encoded time-dependent geometry from the compressor of FIG. 9. The receiver block 320 demultiplexes encoded time-dependent geometry. Depending on the operational mode of the compressor, this encoded data can include quantized basis vectors 322, predicted and/or quantized weights 324, a quantized base mesh in a hierarchical structure 326, quantized geometric transform parameters 328, and a quantized residual (possibly predicted) in a refinement matrix format. Note that the basis vectors 322 and weights 324 can be used to represent the base mesh as well as the residual. Dequantizer blocks 340–348 represent dequantization of each of the respective data types.

If the compressor has used prediction (either row or column) on the base mesh or on the weights of the base mesh and residual, the decompressor performs inverse prediction 350 to restore the matrix to its form before prediction.

Mesh reconstruction block 352 restores the refinement matrix of the residual and the base mesh. In the decompressor, basis synthesis involves k floating point multiply accumulate operations, where k is the number of basis vectors. Note that it is possible to compress the refinement matrix by only sending a subset n of the k basis vectors. The n basis vectors are the most significant vectors; e.g. the first n vectors within k.

Transform block 354 applies the dequantized affine transform coefficients for the current mesh to the corresponding entries in the reconstructed refinement matrix of the base mesh to compute a transformed base mesh. Adder block 356 represents a combination of the dequantized residual and the corresponding elements of the transformed base mesh. The residual is obtained from a portion of the refinement matrix. Expand block 358 then expands the appropriate portion of the reconstructed refinement matrix to compute the reconstructed mesh of the current frame.

Compression of Trajectories

As explained above, the geometric data used to define the motion of the 3D model can be represented as a series of deformation vectors for 3D reference points associated with the 3D model. See Guenter et al. The deformation vectors can be represented in matrix form—e.g., the columns of the matrix correspond to intervals of time and the rows correspond to deformation vectors for the 3D reference points. This matrix can be coded efficiently by decomposing the matrix into basis vectors and coefficients. The coefficients can be coded using temporal prediction. Quantization and entropy coding can also be used to code the basis vectors and coefficients.

Figure 11:
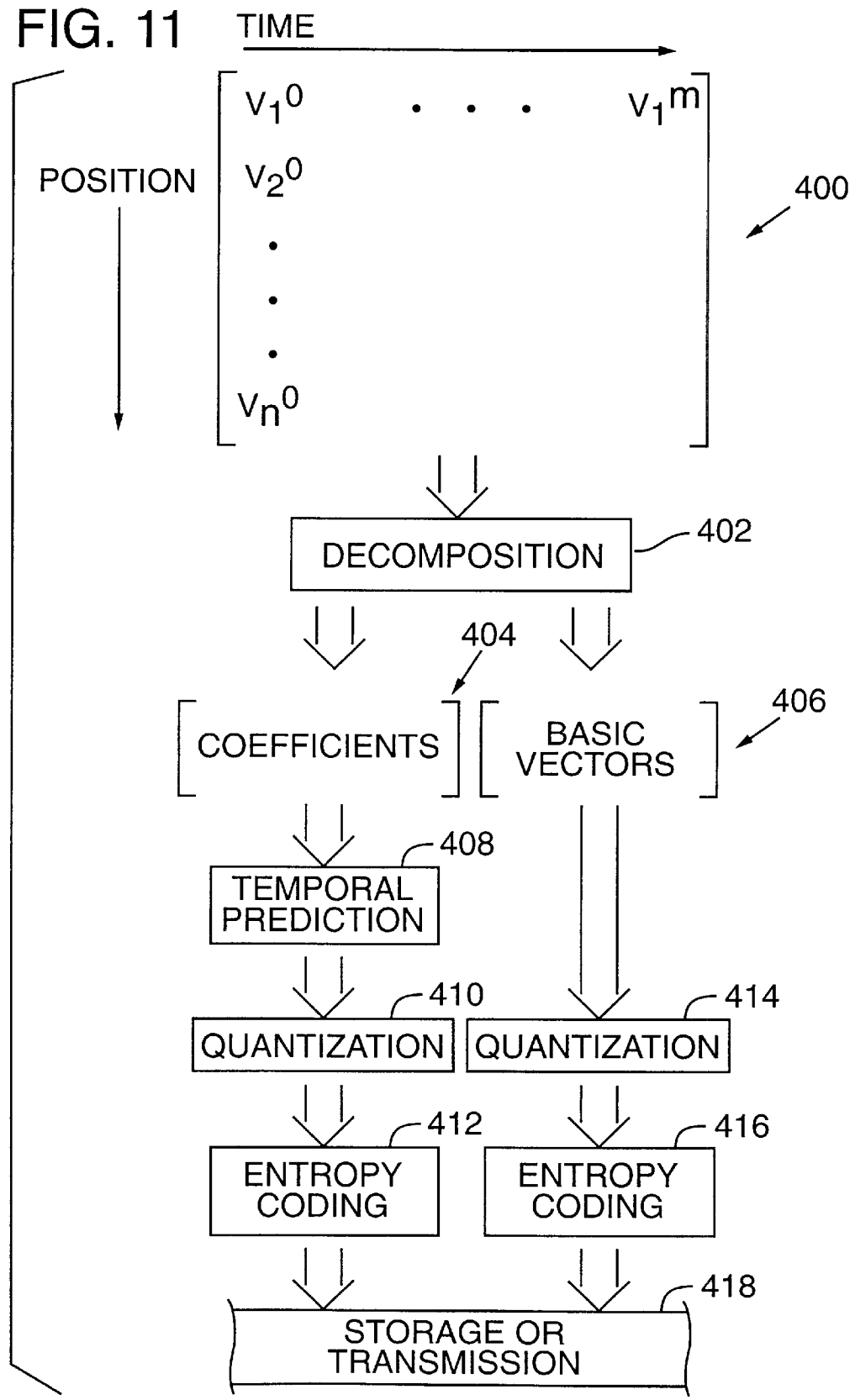
FIG. 11 is a diagram illustrating a coder that uses principal component analysis, temporal prediction, quantization and entropy coding to encode time-varying geometry.

FIG. 11 is a diagram illustrating how a matrix of deformation vectors can be coded in a format that is more efficient to store and transmit. The geometric data is represented as a matrix of deformation vectors (400). In this particular example, the columns correspond to increments of time such as frames in an animation sequence. The rows correspond to 3D vectors that define the position of a corresponding 3D reference point.

The decomposition block (402) is a module for decomposing the matrix into coefficients (404) and basis vectors (406). The temporal prediction block (408) represents a module for performing temporal prediction among the columns in the coefficient matrix. The coefficients and basis vectors can be compressed using quantization and entropy coding as shown in the quantization and entropy coding modules (410, 412, 414, and 416). In the case of the coefficients, prediction can be performed on the matrix of coefficients before or after quantization of the coefficients. Depending on the form of the geometric data and matrix used to store it, it is possible to use prediction on either the columns or the rows of the coefficient matrix.

The output of the entropy coding modules (412, 416) is transferred to a transmitter or a storage device such as a hard disk. In some applications, the deformation vectors are computed, possibly in response to some form of input, and coded for transmission. The "transmitter" refers to the system software and/or hardware used to transmit the coded data over some form of communication medium such as a bus, a computer network, a telephone line, or serial communication link. The manner in which the compressed geometry data is transferred depends on the communication medium.

In other applications not requiring immediate transfer of the deformation data, the compression of the deformation vectors still provides advantages. Specifically, the compressed data requires less storage space and reduces memory bandwidth requirements.

There are a variety of methods for decomposing a matrix into basis vectors and coefficients. Below, we describe one example of how principal component analysis can be applied to compress a matrix representing time varying position of the 3D model.

If we represent our dataset as a matrix A, where frame i of the data maps column i of A, then the first principal component of A is $$\max_u (A^T u)^T (A^T u) \quad (3)$$

The u that maximizes Equation 3 is the eigenvector associated with the largest eigenvalue of $AA^T$, which is also the value of the maximum. Succeeding principal components are defined similarly, except that they are orthogonal to all preceding principal components, i.e., $u_i^T u_j = 0$ for $j \neq i$. The principal components form an orthonormal basis set represented by the matrix U where the columns of U are the principal components of A ordered by eigenvalue size with the most significant principal component in the first column of U.

The data in the A matrix can be projected onto the principal component basis as follows:

$$W = U^T A \quad (4)$$

Row i of W is the projection of column $A_i$ onto the basis vector $u_i$. More precisely, the jth element in row i of W corresponds to the projection of frame j of the original data onto the ith basis vector. We call the elements of the W matrix projection coefficients.

Similarly, A can be reconstructed exactly from W by multiplication by the basis set:

$$A = UW \quad (5)$$

The most important property of the principal components for our purposes is that they are the best linear basis set for reconstruction in the $l_2$ norm sense. For any given matrix $U_k$, where k is the number of columns of the matrix and k<rank(A), the reconstruction error $$e = \|A - U_k U_k^T A\|_F^2 \quad (6)$$

where $\|A\|_F^2$ is the Frobenius norm defined to be $$\|A\|_F^2 = \sum_{i=1}^{m} \sum_{j=1}^{n} a_{ij}^2 \quad (7)$$

will be minimized if $U_k$ is the matrix containing the k most significant principal components of A.

We can compress a data set A by quantizing the elements of its corresponding W and U matrices and entropy coding them. Since the compressed data cannot be reconstructed without the principal component basis vectors, both the W and U matrices have to be compressed. The basis vectors add overhead that is not present with basis sets that can be computed independent of the original data set, such as the DCT basis.

For data sequences that have no particular structure, the extra overhead of the basis vectors would probably outweigh any gain in compression efficiency. However, for data sets with regular frame to frame structure, the residual error for reconstruction with the principal component basis vectors can be much smaller than for other bases. This reduction in residual error can be great enough to compensate for the overhead bits of the basis vectors.

The principal components can be computed using the singular value decomposition (SVD) method described in Strang, *Linear Algebra and its Application,* HBJ, 1988. Efficient implementations of this algorithm are widely available. The SVD of a matrix A is $$A = U\Sigma V^T \quad (8)$$

where the columns of U are the eigenvectors of $AA^T$, the singular values, $\Sigma_i$, along the diagonal matrix $\Sigma$ are the square roots of the eigenvalues of $AA^T$, and the columns of V are the eigenvectors of $A^T A$. The ith column of U is the ith principal component of A. Computing the first k left singular vectors of A is equivalent to computing the first k principal components.

While we have illustrated one type of principal component analysis, other forms of principal component analysis can be used to compress geometry data. Another form of principal component analysis if referred to as the KL transform (Karhunen-Loeve).

Compression of Deformation Vectors of 3D Markers

The geometric data has the long term temporal coherence properties mentioned above since the motion of the face is highly structured. In one test case using this implementation, the overhead of the basis vectors for the geometric data was fixed because there were 182 markers on the 3D object being captured. In this case, the maximum number of basis vectors is 182*3 since there are three numbers, x, y, and z, associated with each marker. The basis vector overhead steadily diminishes as the length of the animation sequence increases.

The geometric data is mapped to matrix form by taking the 3D offset data for the ith frame and mapping it the ith column of the data matrix $A_g$. The projection coefficients are stored in the matrix $W_g$.

There is significant correlation between the columns of projection coefficients because the motion of the 3D reference points is relatively smooth over time. We can reduce the entropy of the quantized projection coefficients by temporally predicting the projection coefficients in column i from column i−1, i.e., $c_{i-1} + \Delta_i$, where we encode the difference between corresponding elements in these columns. To compress the dataset in our test case, we used uniform quantization to quantize the coefficients and then used temporal prediction to compress them further. As noted below, other forms of quantization may be used as well.

Figure 12:
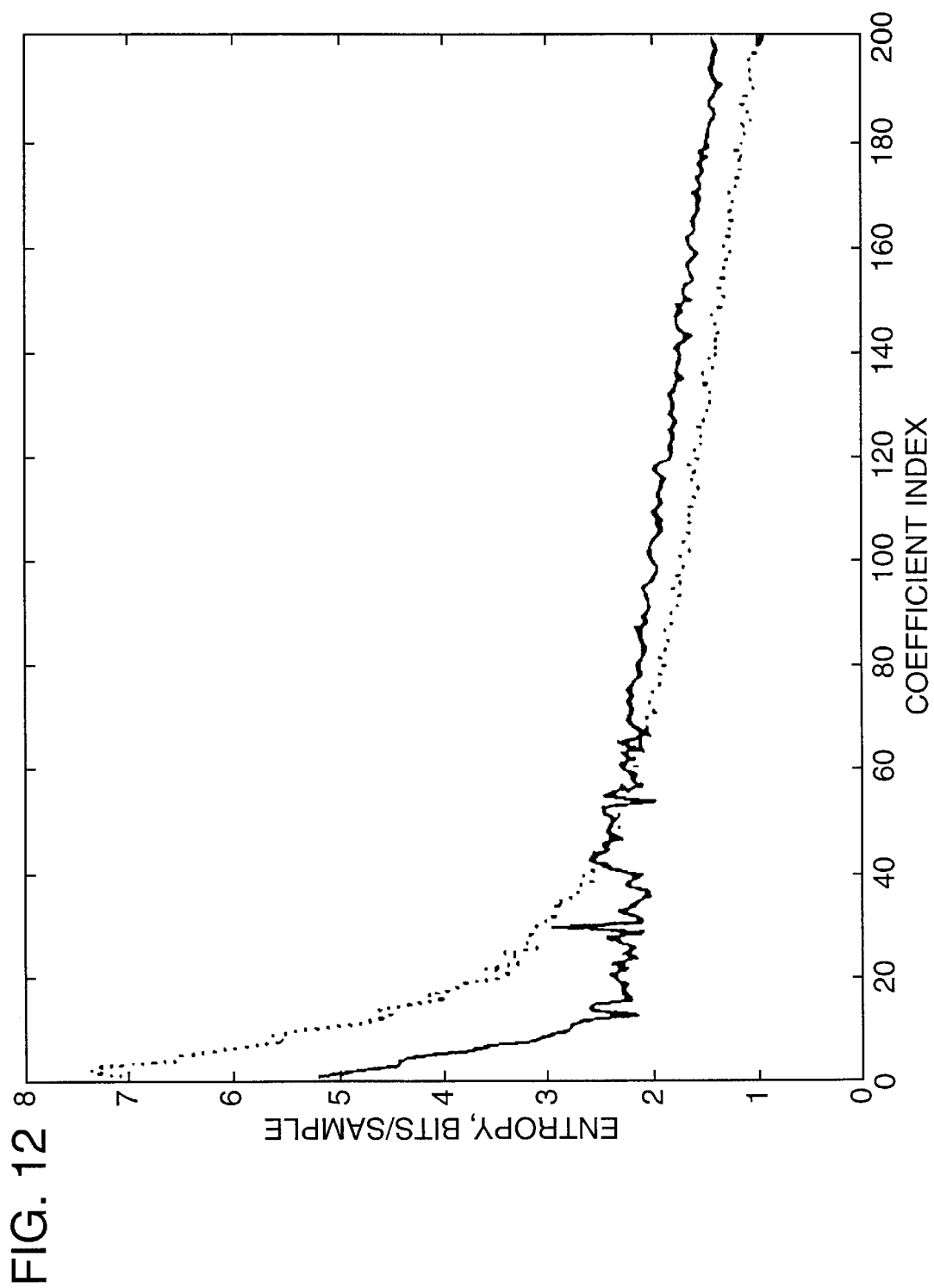
FIG. 12 shows a graph illustrating how temporal prediction of the coefficients generated from a principal component analysis of deformation vectors reduced the entropy of the coefficients.

For our data set, only the projection coefficients associated with the first 45 principal components, corresponding to the first 45 rows of $W_g$, have significant temporal correlation so only the first 45 rows are temporally predicted. The remaining rows are entropy coded directly. After the temporal prediction, the entropy is reduced by about 20 percent in our test case. FIG. 12 shows a graph illustrating how temporal prediction of the first 45 coefficients reduced their entropy. The vertical axis represents entropy in bits per sample, and the horizontal axis represents the coefficient index. In this case, each coefficient is a sample. The dotted line is a plot of the entropy of the coefficients without prediction, and the solid line is a plot of the entropy of the coefficients with prediction.

As noted above, the basis vectors can be compressed further by quantizing them. In our implementation, the basis vectors are compressed by choosing a peak error rate and then varying the number of quantization levels allocated to each vector based on the standard deviation of the projection coefficients for each vector. This form of quantization is sometimes referred to as scalar quantization (SQ). SQ is a quantization method that involves converting real numbers to integers via rounding. In SQ, a rounding function (e.g., round(.)) converts a real number to an integer as in the following examples: the number 4.73 is approximated by round(4.73)=5, the number 3.21 is approximated by round (3.21)=3, and the number −6.1 is approximated by round(− 6.1)=−6. Note that rounding has an approximation error that varies between −0.5 and 0.5, i.e. its maximum absolute value is 0.5. The possible values of the round(.) function are also called quantization levels.

Consider an example where $x_i$ is the ith coordinate of a basis vector, and i varies from 1 to N, where N is the number of all coordinates in all vectors. An example of an SQ method is as follows:

1) Look at all $x_i$ (i.e. for i=1, 2, . . . , N), and call V their maximum absolute value; i.e. V=max $\{|x_i|\}$, for all i.
2) Set a maximum relative error (the "peak error rate") d. For example, d=0.001 means a maximum relative error of 0.1%.
3) Scale all $x_i$ by a "gain" factor A, with A=0.5/(d*V), i.e. compute $y_i$=A*$x_i$, for all i.
4) Now quantize the values by rounding to the nearest integer: $u_i$=round($y_i$), for all i.
5) Scale back the quantized values by the inverse of A, i.e. compute $v_i$=$u_i$/A, for all i.

Note that the quantized $v_i$ values are now an approximation to the original values $x_i$. The quality of the approximation is controlled by the parameter d, because the maximum relative error satisfies max($|x_i-v_i|$)/max $\{|x_i|\}$<=d.

Note that there is a one-to-one relationship between the $v_i$ and the $u_i$. Since the $u_i$ are integers, they are represented with a finite number of bits. Furthermore, the $u_i$ with small values need fewer bits than those with large values.

Finally, for a given set of images, the values $u_i$ for the vector will have a non-uniform probability distribution. For example, because many of the values of $y_i$ are typically very small, many of the values of $u_i$ will be zero. Quantization, thus, allows the quantized data to be compressed more efficiently via an entropy coder, which assigns code words to each value based on their probability of occurrence. The graph in FIG. 12 shows the entropy (the average number of bits per coefficient) for such coders.

Alternative forms of quantization can be used. For example, the numbers $x_i$ could be grouped into small vectors (e.g., groups of M=4 or M=8 values), and then compressed using vector quantization (VQ). In VQ, a vector is approximated by its nearest neighbor in a regular or irregular lattice of points in the M-dimensional space.

In practice, for the data generated in our test case, there would be little improvement in using VQ—maybe 20% better compression at most.

As noted, the predicted coefficients and quantized basis vectors can be compressed further using entropy coding such as arithmetic or Huffman coding. Entropy coding compresses the geometric data further by assigning shorter codes to samples that occur more frequently and longer codes to samples that occur less frequently.

We visually examined animation sequences with $W_g$ compressed at a variety of peak error rates. The entropy of $W_g$ for an error level of about 0.001 or 0.002 is 36 kbits/sec and the entropy of $U_g$ is 13 kbits/sec for a total of 40 kbits/sec for all the geometric data. These values are averages for our 3330 frame animation second sequence.

Decompression

The geometry data is decoded by performing the coding steps in reverse. First, an entropy decoder reconstructs the basis vectors and coefficients from the variable length codes. Next, the coefficients are reconstructed from the predicted coefficients An inverse quantizer then restores the coefficients and basis vectors. The original matrix of deformation vectors is then reconstructed from the basis vector and coefficent matrices.

Segmentation and Geometric Transforms as Deformation Trajectory Encoder

Guenter et al are given a set of deformation controls as input to their system (e.g., by the positions of the fluorescent dots on the face or body of the actor). The techniques described in this section estimate the deformation controls given the raw vertex matrix. Given an intial vertex matrix, V, and then applying the segmentation and geometric transform coding techniques described above results in a factorization of the form V=AB, where A is a set of trajectories and B is a set of influence weights. For example, for the affine geometric coder, the lefthand side is a set of time-dependent affine transforms and the right side is the set of initial base meshes, $$V=\{A_0 A_1 \ldots A_{n-1}\} \operatorname{diag}(V_0 V_1 \ldots V_{n-1}).$$

Interpreted geometrically, A is a set of time varying deformation controls. For the affine example, the controls are a set of points that define a rotation, scale, and skew around a translation center near the original surface.

Operating Environment

The prototype was implemented on two systems:
1) A workstation from Silicon Graphics, Inc.
   a. Indigo2 model with a 150 MHz MIPS R4400 processor and 128 MB memory running the IRIX 5.3 operating system.
   b. Extreme graphics co-processor running OpenGL.
2) A Gateway2000 computer from Gateway, Inc.
   a. E5000 model with a 300 MHz Intel Pentium II processor and 128 MB memory running the Microsoft Windows 98 operating system.
   b. Diamond Multimedia Viper550 graphics card using NVIDIA RivaTNT graphics chipset running the Microsoft DirectX multimedia API.

Figure 13:
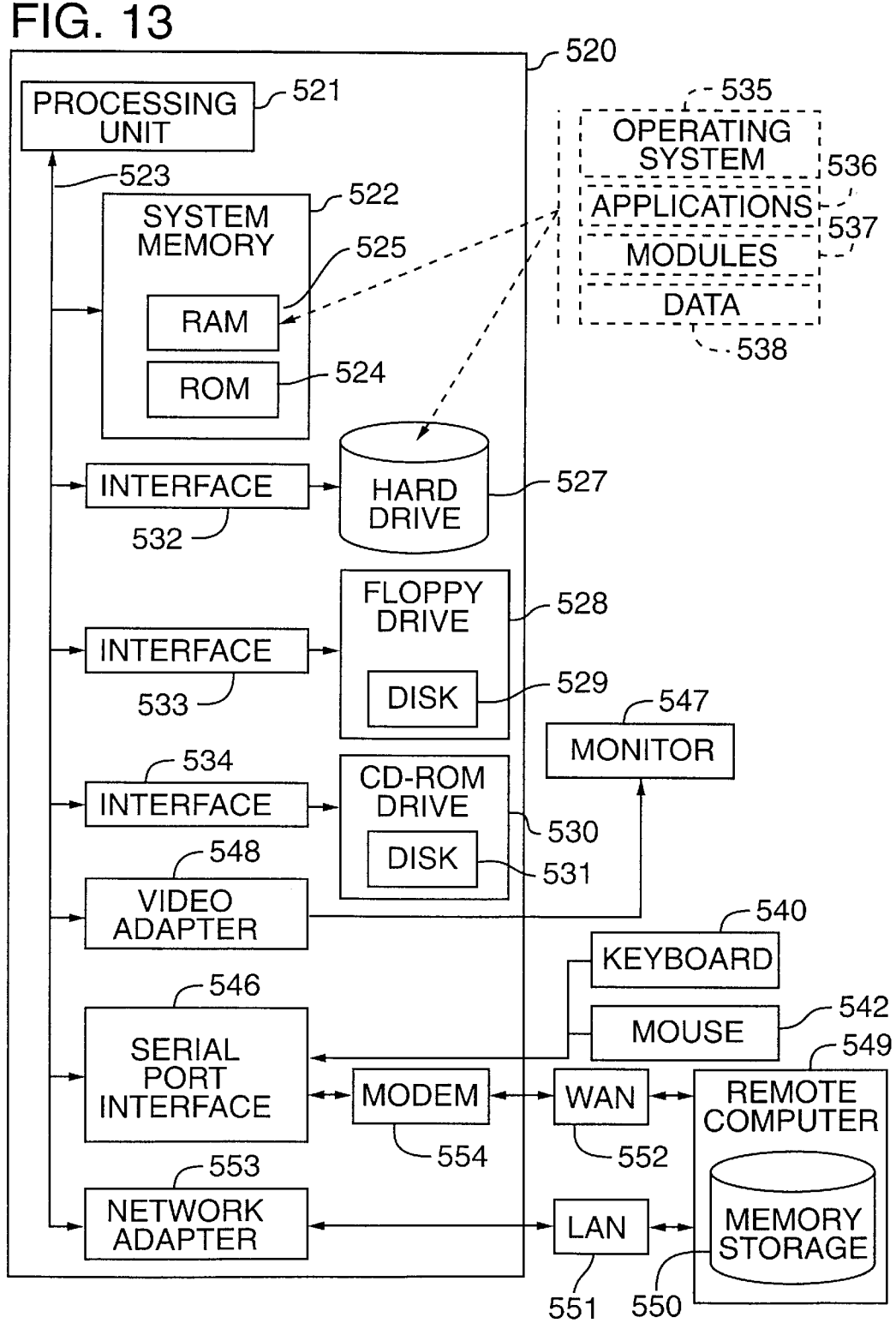
FIG. 13 is a block diagram illustrating a computer system that acts as an operating environment for software implementations of the invention.

FIG. 13 and the following discussion are intended to provide a brief, general description of a suitable computing environment in which the software routines described above can be implemented.

FIG. 13 shows an example of a computer system that may be used as an operating environment for the invention. The computer system includes a conventional computer 520, including a processing unit 521, a system memory 522, and a system bus 523 that couples various system components including the system memory to the processing unit 521. The system bus may comprise any of several types of bus structures including a memory bus or memory controller, a peripheral bus, and a local bus using any of a variety of conventional bus architectures such as PCI, VESA, Microchannel, ISA and EISA, to name a few. The system memory includes read only memory (ROM) 524 and random access memory (RAM) 525. A basic input/output system 526 (BIOS), containing the basic routines that help to transfer information between elements within the computer 520, such as during start-up, is stored in ROM 524. The computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of data, data structures, computer-executable instructions, etc. for the computer 520. Although the description of computer-readable media above refers to a hard disk, a removable magnetic disk and a CD, other types of media which are readable by a computer, such as magnetic cassettes, flash memory cards, digital video disks, Bernoulli cartridges, and the like, may also be used in this computing environment.

A number of program modules may be stored in the drives and RAM 525, including an operating system 535, one or more application programs (such as the compressor and decompressor routines detailed above) 536, other program modules 537, and program data 538 (e.g., the matrix V, geometric transform parameters, the refinement matrix of the residual, and base mesh, etc.). A user may enter commands and information into the computer 520 through a keyboard 540 and pointing device, such as a mouse 542. Other input devices (not shown) may include a microphone, joystick, game pad, satellite dish, scanner, or the like. These and other input devices are often connected to the processing unit 521 through a serial port interface 546 that is coupled to the system bus, but may be connected by other interfaces, such as a parallel port, game port or a universal serial bus (USB).

A monitor 547 or other type of display device is also connected to the system bus 523 via an interface, such as a video controller 548. The video controller manages the display of output images generated by the rendering pipeline by converting pixel intensity values to analog signals scanned across the display. Some graphics workstations include additional rendering devices such as a graphics accelerator that plugs into an expansion slot on the computer or a graphics rendering chip set that is connected to the processor and memory via the bus structure on the mother board. Such graphics rendering hardware accelerates image generation, typically by using special purpose hardware to scan convert geometric primitives such as the polygons formed by the meshes in V.

The computer 520 may operate in a networked environment using logical connections to one or more remote computers, such as a remote computer 549. The remote computer 549 may be a server, a router, a peer device or other common network node, and typically includes many or all of the elements described relative to the computer 520, although only a memory storage device 550 has been illustrated in FIG. 13. The logical connections depicted in FIG. 13 include a local area network (LAN) 551 and a wide area network (WAN) 552. Such networking environments are commonplace in offices, enterprise-wide computer networks, intranets and the Internet.

When used in a LAN networking environment, the computer 520 is connected to the local network 551 through a network interface or adapter 553. When used in a WAN networking environment, the computer 520 typically includes a modem 554 or other means for establishing communications over the wide area network 552, such as the Internet. The modem 554, which may be internal or external, is connected to the system bus 523 via the serial port interface 546. In a networked environment, program modules depicted relative to the computer 520, or portions of them, may be stored in the remote memory storage device. The network connections shown are just examples and other means of establishing a communications link between the computers may be used.

TABLE 1

Example Compression Results

| Affine Quantization (bits) | Vertex Quantization (bits) | SNR (dB) | Quantized Size (bytes) | Compression Ratio | Gzip Size (bytes) | Compression Ratio, Gzip | Amortized Bandwidth (K bytes/s) |
|---|---|---|---|---|---|---|---|
| 10 | 4 | 27.69 | 1962000 | 7.4 | 433734 | 33 | 63.5 |
| 12 | 4 | 31.33 | 1990800 | 7.3 | 467153 | 31 | 68.4 |
| 14 | 4 | 32.06 | 2019600 | 7.2 | 510058 | 28 | 74.7 |
| 16 | 4 | 32.11 | 2048400 | 7.1 | 526982 | 27 | 77.2 |
| 10 | 8 | 28.00 | 3780000 | 3.8 | 1004086 | 14 | 147.1 |
| 12 | 8 | 33.90 | 3808800 | 3.8 | 1036927 | 14 | 151.9 |
| 14 | 8 | 39.77 | 3837600 | 3.8 | 1079085 | 13 | 158.1 |
| 16 | 8 | 43.37 | 3866400 | 3.8 | 1096496 | 13 | 160.6 |
| NA | 16 | 46.93 | 7272000 | 2.0 | 6654007 | 2.2 | 974.7 |

Table 1 shows the results in a codec in which geometric transform coding (Affine-Match) with residual row prediction compresses the time-dependent vertex matrix which is then followed by entropy coding (using the Lempel-Ziv approach of GNU's gzip). The table is sorted by ratio of the uncompressed floating point vertex matrix (of size 14544000 bytes=400 frames*3030 vertices/frame*3 coord/vertex*4 bytes/coord) to the compressed mesh. For comparison, the last row shows the raw vertex matrix quantized to 16 bits.

TABLE 2

| | Chicken | | | | Face | | | |
| --- | --- | --- | --- | --- | --- | --- | --- | --- |
| | Size (M bytes) | Ratio | Startup (K bytes) | Bandwidth (K byte/s) | Size (M bytes) | Ratio | Startup (K bytes) | Bandwidth (K byte/s) |
| Uncompressed | 13.9 | 1 | 66.4 | 2,130.5 | 21.7 | 1 | 36.8 | 622.3 |
| MPEG4 (static) | 2.7 | 5 | 1.6 | 409.3 | 3.8 | 6 | 0.6 | 107.8 |
| Guenter et al | — | — | — | — | 1.2 | 19 | ~1000 | 5.0 |
| Affine Match | 0.5 | 27 | 57.9 | 68.6 | 3.9 | 6 | 51.3 | 109.7 |
| Affine Match (applied to face dot trajectories) | | | | | 0.7 | 33 | 74.4 | 16.7 |

Table 2 shows a comparison among various compression techniques. These results reflect high compression for the affine match technique when the animated model is close to an affinely transformed model (Chicken column, bottom row.) The experimental compressor of MPEG4 is not designed to exploit the animation of the hierarchy. For the face example, the generic affine match compressor applied to the full vertex matrix does worse than the MPEG4 experimental coder applied to each frame. When applied to the dot trajectories the affine match compressor does a better job. This shows that the compressor must search through a larger class of animation models than just the affine match to find the best matching encoder.

Alternatives

While the invention is illustrated with reference to several possible implementations, it is important to note that the invention is not limited to the scope of these specific implementations. Implementations of the invention may incorporate one or more of the novel coding methods described above. In addition, the coding methods described above may be used in combination with other coding methods. Frequency domain coders such as Discrete Cosine Transform (DCT), wavelet/zero-tree coders may be applied to matrices of representing time-varying geometric data, including a matrix of vertex positions, a matrix of deformation vectors or trajectories, and a matrix of the residual. These forms of coding may be particularly effective when applied to the residual matrix in the coding methods described above. After the geometric structure is removed (e.g., the affinely transformed base mesh is removed from the current matrix of vertex positions), frequency domain coders may be applied to the residual matrix. In addition to frequency domain coders, entropy coders and quantization may be used to further compress data in the varying geometry stream.

The compression techniques may be applied across other dimensions rather than just space and time as noted above.

In view of the many possible embodiments to which the principles of the invention may be applied, it should be recognized that the implementations discussed above are only examples of the invention and should not be taken as a limitation on the scope of the invention. Rather, the scope of the invention is defined by the following claims. I therefore claim as my invention all that comes within the scope and spirit of these claims.

I claim:

1. A method for compressing a series of 3D meshes representing time-dependent geometry in an animation, the method comprising:

converting a matrix of vertex positions into a data structure hierarchically representing the meshes in geometric levels of detail that provide geometric scalability and temporal levels of detail that provide temporal scalability;

encoding deltas between each level of detail; and encoding records, wherein each record specifies information for at least one of the geometric or temporal levels of detail for reconstruction of at least part of the time-dependent geometry in the animation.

2. The method of claim 1 further including:

selectively transmitting one or more of the records.

3. The method of claim 2 further including:

evaluating a screen space projection of the animation for a current time sample to determine which of the records to transmit for the current time sample.

4. The method of claim 1 wherein the converting the matrix of vertex positions into a data structure includes:

segmenting the matrix into segments that are animated independently; and converting each of the segments into a segment data structure.

5. The method of claim 1 wherein the geometric levels of detail are coded using mesh edge collapses.

6. The method of claim 1 wherein the converting the matrix of vertex positions into a data structure includes:

converting a base mesh into a base mesh hierarchy of mesh refinements.

7. The method of claim 1 wherein the temporal levels of detail are coded using temporal edge collapses.

8. The method of claim 1 wherein the temporal levels of detail are for vertex positions and animation coefficients splined through time.

9. The method of claim 8 wherein detail is added with knot insertions.

10. The method of claim 1 wherein the temporal levels of detail are separated with wavelets.

11. A computer readable medium having instructions for performing the method of claim 1.

12. A method for selective playback of time-dependent geometry in an animation, the method comprising:

specifying a geometric level of detail for the animation;

receiving a geometric update record indicating at least part of the time-dependent geometry in the animation for the specified geometric level of detail;

specifying a temporal level of detail for the animation, wherein plural temporal levels of detail provide temporal scalability of the time-dependent geometry in the animation; and receiving a temporal update record indicating at least part of the time-dependent geometry in the animation for the specified temporal level of detail.

13. The method of claim 12 wherein the geometric update record indicates coarsening or refinement for the specified geometric level of detail.

14. The method of claim 12 wherein a texture image to be mapped to an object in the animation is encoded hierarchically such that the texture image is represented at varying spatial resolutions, a first texture level of detail is transferred initially, and then a higher or lower texture level of detail is communicated to provide a selected texture level of detail for the texture image.

15. The method of claim 14 wherein the texture image is animated and temporal texture level of detail of the texture image is selectively increased or decreased to provide a selected temporal texture level of detail.

16. The method of claim 14 wherein a texture update record provides texture image information for the selected texture level of detail in response to a request for the selected texture level of detail.

17. A computer readable medium having software for performing the method of claim 12.

18. A method for encoding a series of 3D meshes representing moving geometry in an animation, the method comprising:

selecting a spatial or temporal dimension for inter-mesh scalability along the selected dimension in the animation;

converting a matrix of vertex positions into a data structure hierarchically representing the meshes in geometric levels of detail for intra-mesh geometric scalability and selected dimensional levels of detail for the inter-mesh scalability along the selected dimension; and encoding update records, wherein each update record specifies information for at least one of the geometric or selected dimensional levels of detail for reconstruction of at least part of the moving geometry in the animation.

19. The method of claim 18 wherein the selected dimension is spatial and a desired position in the spatial dimension is specified through user input to control playback of the animation along the spatial dimension.

20. The method of claim 18 wherein the selected dimension is temporal and a desired granularity in the temporal dimension is specified to control temporal level of detail during playback of the animation along the time dimension.

21. In a method of compressing a series of plural geometry meshes representing time-dependent geometry in an animation, an improvement comprising:

encoding the series of plural geometry meshes in plural temporal levels of detail, wherein the plural temporal levels of detail provide temporal scalability in transmission or reconstruction of the time-dependent geometry in the animation.

22. The improvement of claim 21 wherein one or more update records include one or more temporal edge collapse/split records for vertex positions splined through time for the plural temporal levels of detail.

23. The improvement of claim 21 wherein one or more update records include one or more temporal edge collapse/split records for animation coefficients splined through time for the plural temporal levels of detail.

24. The improvement of claim 21 wherein one or more update records include wavelet coefficients for the plural temporal levels of detail.

25. A computer-readable medium storing computer-executable instructions for causing a computer programmed thereby to perform a method of compressing a series of three-dimensional geometric meshes representing moving geometry in an animation, the method comprising:

identifying a spatial or temporal dimension for inter-mesh scalability along the identified dimension in the animation; and converting the series of three-dimensional geometric meshes into one or more hierarchical representations including geometric levels of detail that provide geometric scalability and identified dimensional levels of detail that provide the inter-mesh scalability along the identified dimension.

26. The computer-readable medium of claim 25 wherein the converting includes:

converting a base mesh for the series into a base mesh hierarchy, wherein the base mesh is a first mesh of the series.

27. The computer-readable medium of claim 25 wherein the converting includes:

converting a base mesh for the series into a base mesh hierarchy, wherein the base mesh is an average mesh for the series or is computed by non-linear optimization of transformation parameters and the base mesh.

28. The computer-readable medium of claim 25 wherein the identified dimension is time.

29. The computer-readable medium of claim 25 wherein the identified dimension is a path in space.

30. The computer-readable medium of claim 25 wherein the identified dimension is an angle in space.

31. The computer-readable medium of claim 25 wherein the identified dimension is predetermined.

32. The computer-readable medium of claim 25 further comprising:

creating one or more update records, each of the one or more update records specifying information for at least one of the levels of detail for updating at least part of the moving geometry in the animation; and selectively transmitting the one or more update records.

33. The computer-readable medium of claim 32 wherein the selectively transmitting depends upon user input.

34. The computer-readable medium of claim 32 wherein the selectively transmitting depends upon expected focus of attention for the animation.

35. The computer-readable medium of claim 32 wherein the selectively transmitting depends upon bandwidth constraints.

36. The computer-readable medium of claim 25 wherein the converting includes:

identifying plural segments in the series and converting each of the plural segments into a segment hierarchical representation of the one or more hierarchical representations.

37. The computer-readable medium of claim 25 wherein the converting includes splining one or more identified dimension edge collapse/split records for vertex positions through time for the identified dimensional levels of detail.

38. The computer-readable medium of claim 25 wherein the converting includes splining one or more identified dimension edge collapse/split records for animation coefficients through time for the identified dimensional levels of detail.

39. The computer-readable medium of claim 25 wherein the converting includes computing wavelet coefficients for the identified dimensional levels of detail.

40. A computer-readable medium storing moving geometry for an animation, the moving geometry comprising:

a base three-dimensional geometric mesh comprising basic portions of one or more hierarchical representations of the animation, wherein the one or more hierarchical representations include plural geometric levels of detail that provide geometric intra-mesh scalability and plural other levels of detail that provide inter-mesh scalability along a spatial or temporal dimension; and one or more update records, each of the one or more update records specifying information for at least one of the levels of detail for reconstruction of at least part of the moving geometry in the animation.

41. In a method of playing back time-dependent geometry in an animation, an improvement comprising:

specifying a temporal level of detail for the animation, wherein plural temporal levels of detail provide temporal scalability of the time-dependent geometry in the animation; and receiving additional time-dependent geometry information for the animation at the specified temporal level of detail.

42. The improvement of claim 41 further comprising:

before the specifying, receiving base time-dependent geometry information for the animation at a base level of detail.

43. In a method of facilitating playback of time-dependent geometry in an animation, an improvement comprising:

receiving an indication of a temporal level of detail for the animation, wherein plural temporal levels of detail provide temporal scalability of the time-dependent geometry in the animation; and sending additional time-dependent geometry information for the animation at the indicated temporal level of detail.

44. The improvement of claim 43 further comprising:

before the receiving, sending base time-dependent geometry information for the animation at a base level of detail.

45. A computer-readable medium storing computer-executable instructions for causing a computer programmed thereby to perform a method of playing back moving geometry in an animation, the method comprising:

identifying a spatial or temporal dimension for inter-mesh scalability along the identified dimension in the animation;

specifying a geometric level of detail for the animation; and receiving time-dependent geometry information for the animation at the specified geometric level of detail;

specifying an identified dimensional level of detail for the animation; and receiving time-dependent geometry information for the animation at the specified identified dimensional level of detail.

46. A computer-readable medium storing computer-executable instructions for causing a computer programmed thereby to perform a method of compressing a series of plural three-dimensional geometric meshes for an animation, each of the plural three-dimensional geometric meshes including three-dimensional coordinate values for each of plural points for the animation, the method comprising:

storing the series of plural three-dimensional geometric meshes in a data structure, wherein the data structure includes plural geometry records, each of the plural geometry records including three-dimensional geometry information for a corresponding three-dimensional geometric mesh of the plural three-dimensional geometric meshes, wherein the data structure aligns each of the plural points for the animation between meshes across the series of plural three-dimensional geometric meshes; and compressing the series of plural three-dimensional geometric meshes.

47. The computer-readable medium of claim 46 wherein the compressing includes:

converting the series of plural three-dimensional geometric meshes into a hierarchical representation including plural inter-mesh levels of detail across the series of plural three-dimensional geometric meshes and plural geometric levels of detail for each of the plural geometry records.

* * * * *

UNITED STATES PATENT AND TRADEMARK OFFICE
CERTIFICATE OF CORRECTION

PATENT NO. : 6,614,428 B1
DATED : September 2, 2003
INVENTOR(S) : Lengyel

It is certified that error appears in the above-identified patent and that said Letters Patent is hereby corrected as shown below:

Column 5,
Line 33, the expression should read:

$$-- P = \begin{bmatrix} \underset{\text{interpolation}}{\text{time}} \\ S \end{bmatrix} \begin{bmatrix} \underset{\text{positions}}{\text{vertex}} \\ V \end{bmatrix} \begin{bmatrix} \underset{\text{interpolation}}{\text{geometry}} \\ G \end{bmatrix} --.$$

Line 54, "continuous positions" should read -- vertex positions --.

Column 7,
Line 25, "$V$" should read -- $\hat{V}$ --.
Line 43, "weight" should read -- weights --.

Column 22,
Line 39, "$Dp_{m-1,0}$" should read -- $D_{m-1,0}$ --.
Line 39, "$D_{m1,3}$" should read -- $D_{m-1,3}$ --.

Column 33,
Line 8, "$\max_u$" should read -- $\max\limits_u$ --.

Column 35,
Line 30, "$\max(|x_i\text{-}v_i)$" should read -- $\max(|x_i\text{-}v_i|)$ --.

Column 39,
Lines 65 and 67, "scalability" should read -- simplications --.

Column 40,
Line 58, "scalability" should read -- simplifications --.

Column 41,
Lines 20, 24, 26, 46 and 66, "scalability" should read -- simplifications --.
Lines 50-51 and 54-55, "collapse/split" should read -- collapse --.

UNITED STATES PATENT AND TRADEMARK OFFICE
CERTIFICATE OF CORRECTION

PATENT NO. : 6,614,428 B1
DATED : September 2, 2003
INVENTOR(S) : Lengyel

It is certified that error appears in the above-identified patent and that said Letters Patent is hereby corrected as shown below:

Column 42,
Lines 4, 5, 65 and 67, "scalability" should read -- simplifications --.
Lines 36-37, "expected focus of attention" should read -- a viewpoint --.

Column 43,
Lines 9, 23 and 37, "scalability" should read -- simplifications --.

Column 44,
Lines 20, 21 and 37-38, "geometry records" should read -- rows --.
Line 24, "aligns each" should read -- aligns by column each --.

Signed and Sealed this

Seventeenth Day of January, 2006

JON W. DUDAS
*Director of the United States Patent and Trademark Office*